Oct. 26, 1943.　　　L. H. GLASSMAN ET AL　　　2,332,511
SIGNATURE WRITING APPARATUS
Filed Oct. 5, 1940　　　15 Sheets-Sheet 1

Inventors
LOUIS H. GLASSMAN,
CLARENCE W. BURGER,

By Don T. Hatfield

Attorney

Oct. 26, 1943.   L. H. GLASSMAN ET AL   2,332,511
SIGNATURE WRITING APPARATUS
Filed Oct. 5, 1940   15 Sheets-Sheet 4

Inventors
LOUIS H. GLASSMAN,
CLARENCE W. BURGER,
By Dos T. Matfield
Attorney

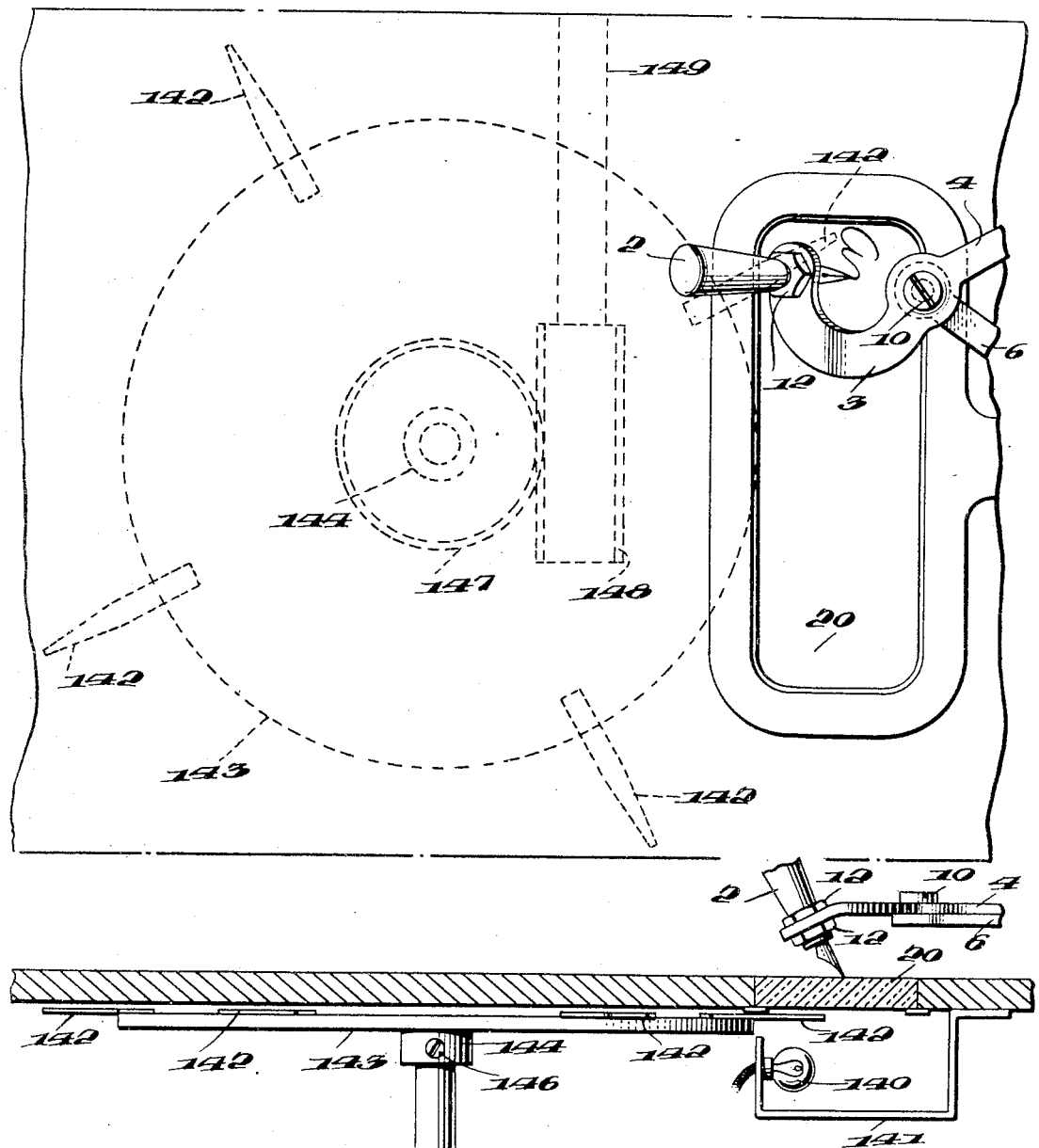
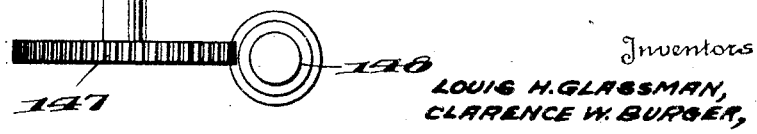

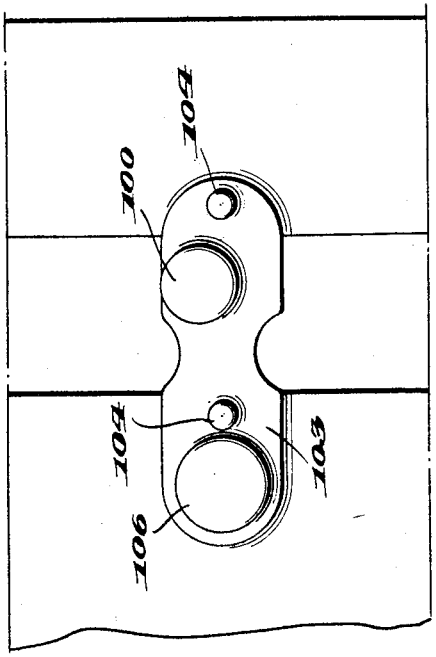
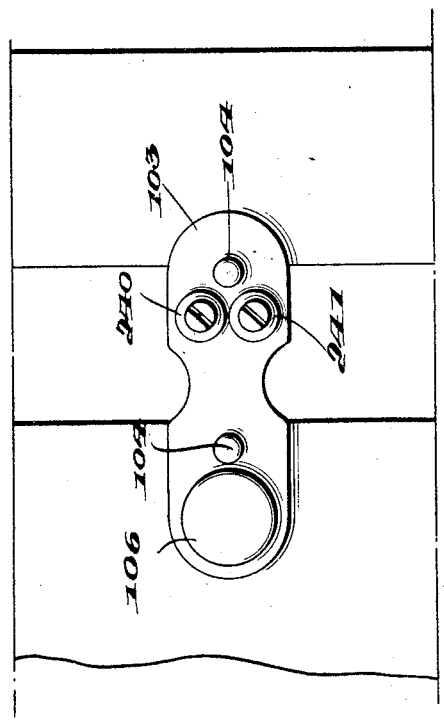
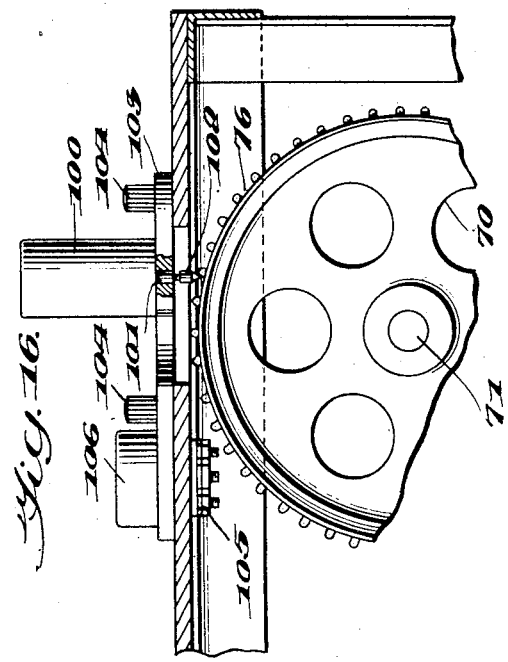
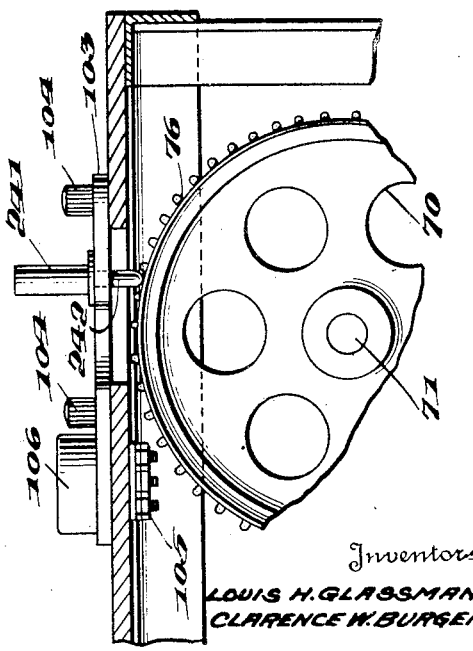

Oct. 26, 1943.  L. H. GLASSMAN ET AL  2,332,511
SIGNATURE WRITING APPARATUS
Filed Oct. 5, 1940   15 Sheets-Sheet 8
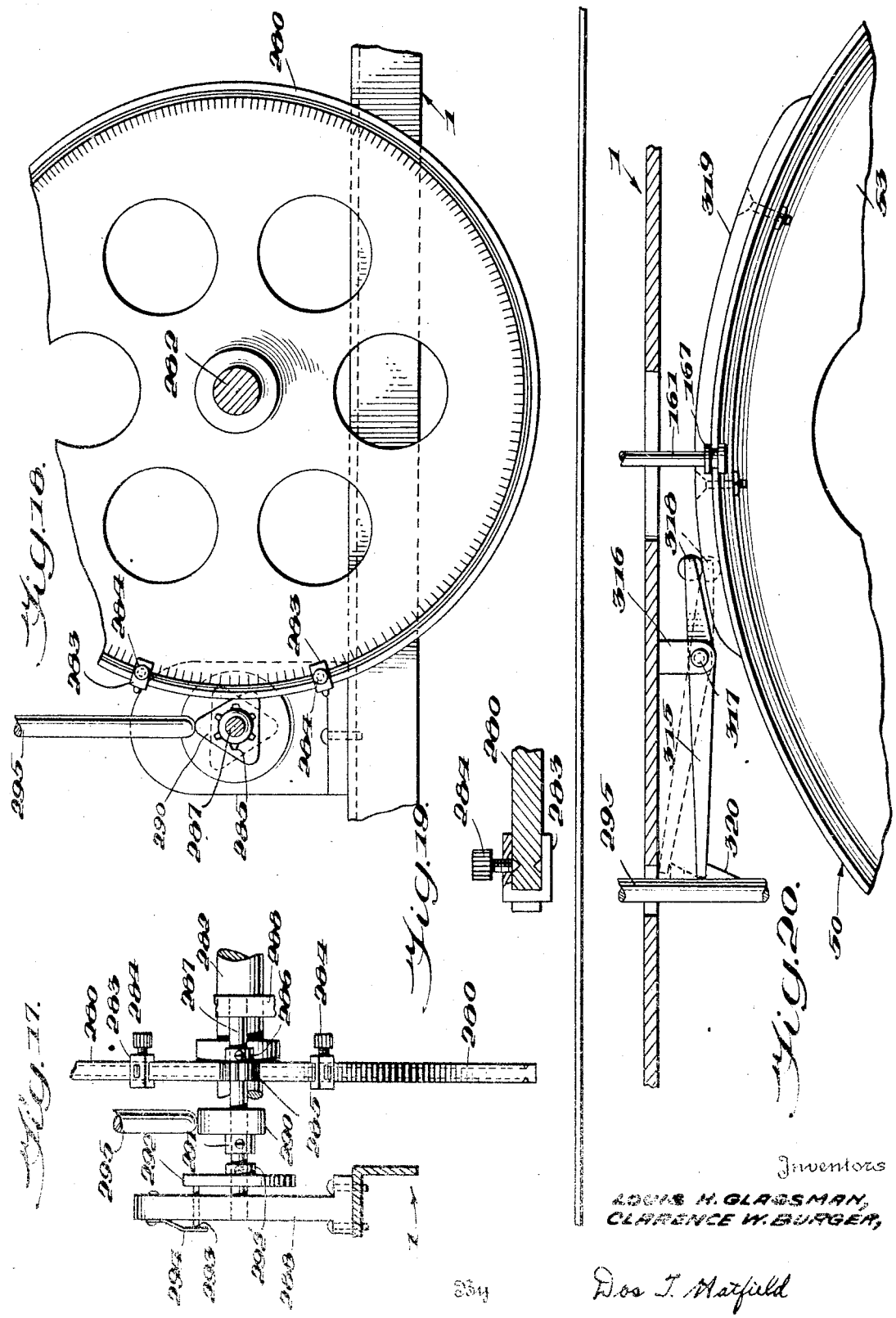

Oct. 26, 1943.  L. H GLASSMAN ET AL  2,332,511
SIGNATURE WRITING APPARATUS
Filed Oct. 5, 1940   15 Sheets-Sheet 9
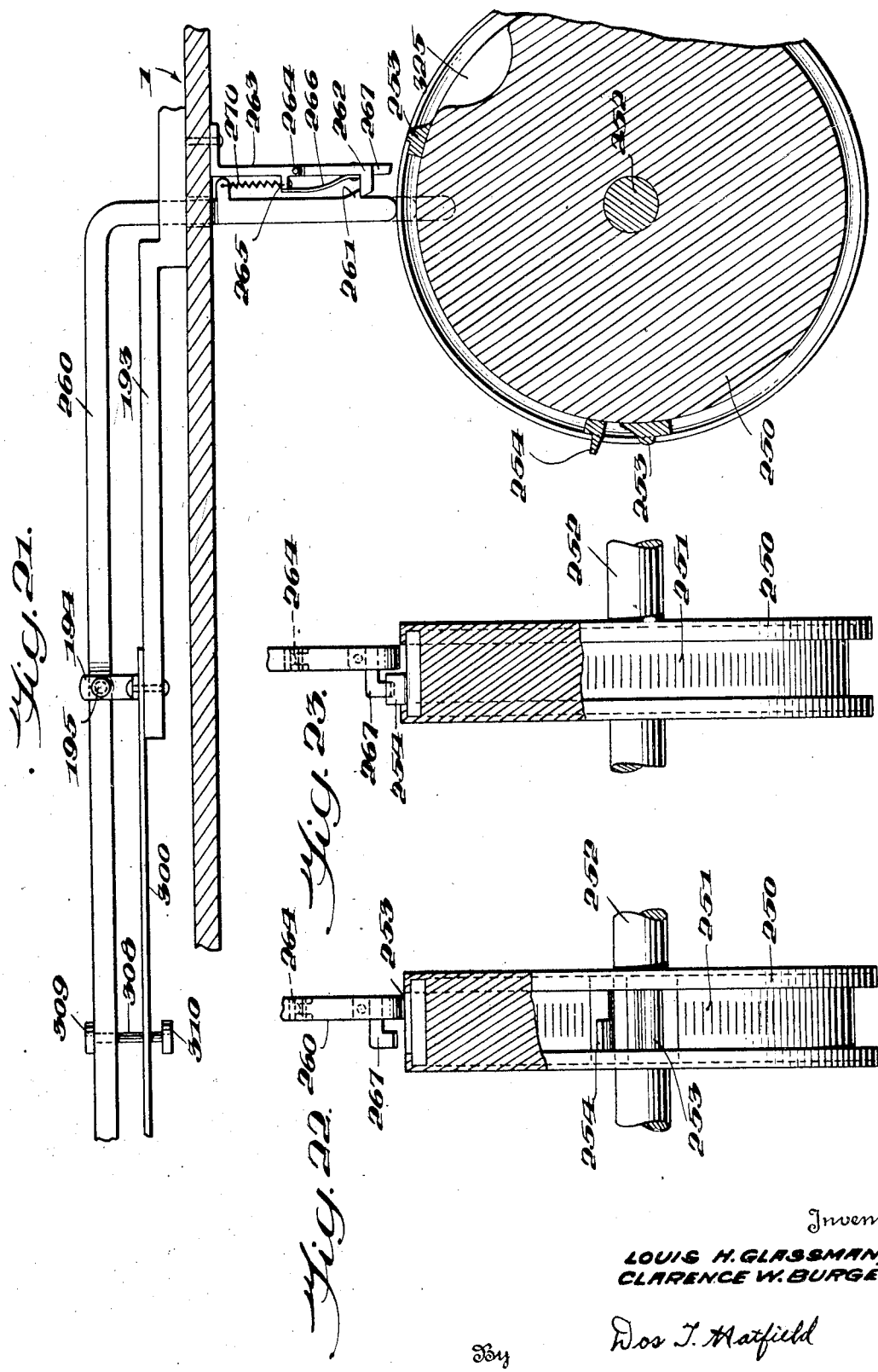
Inventors
LOUIS H. GLASSMAN,
CLARENCE W. BURGER,
By Wos T. Hatfield
Attorney

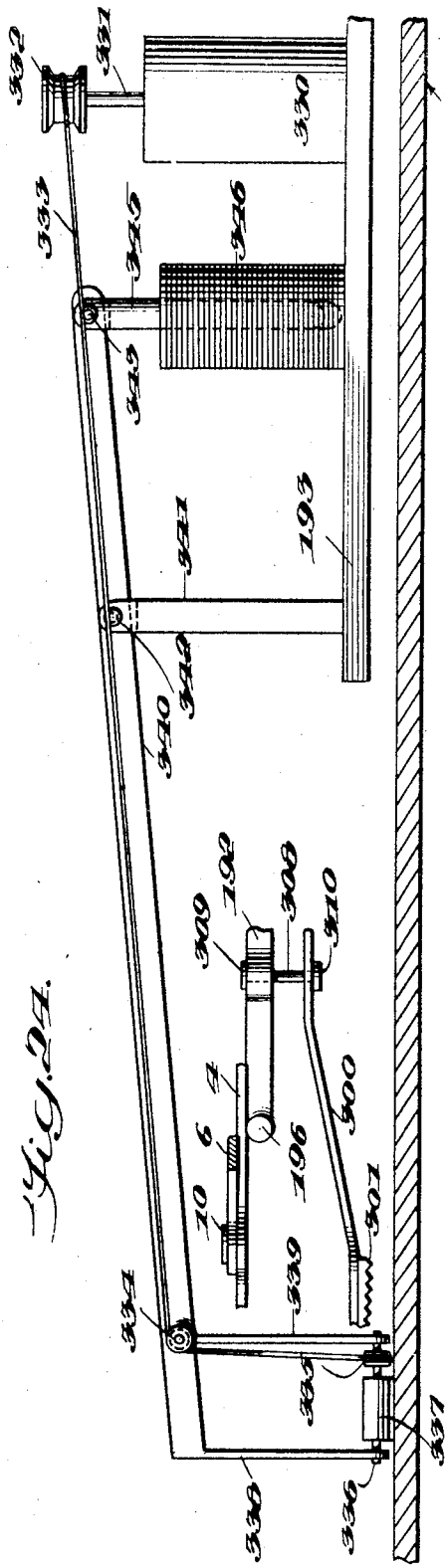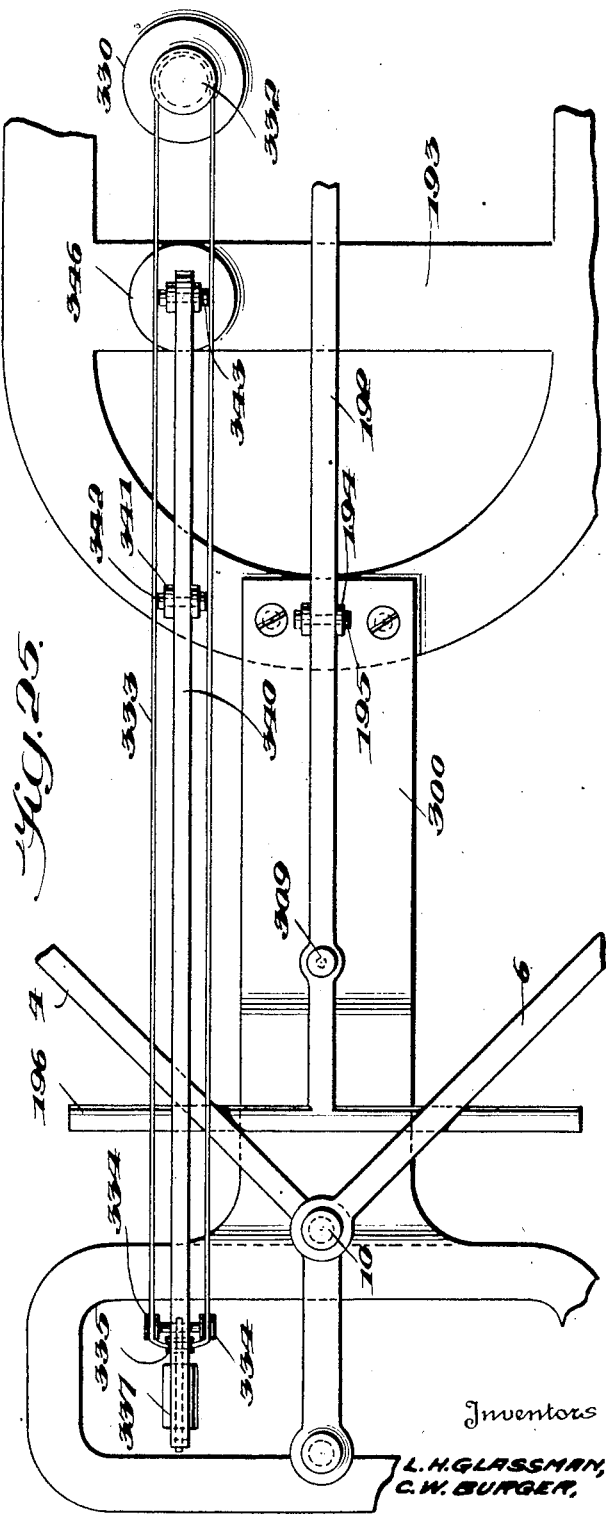

Oct. 26, 1943.   L. H. GLASSMAN ET AL   2,332,511
SIGNATURE WRITING APPARATUS
Filed Oct. 5, 1940   15 Sheets-Sheet 11
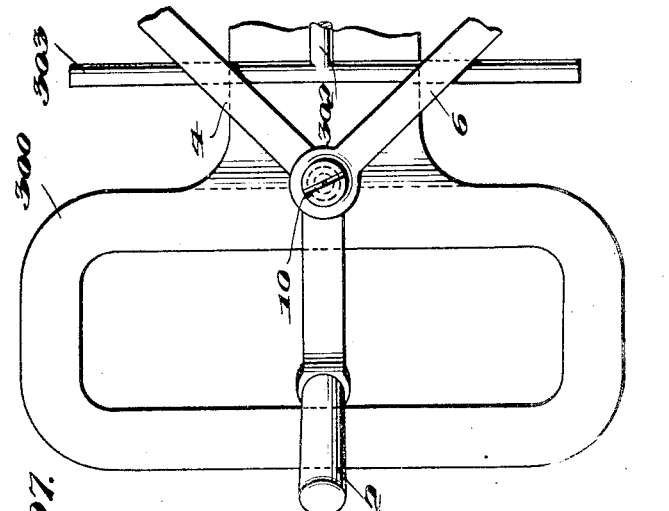
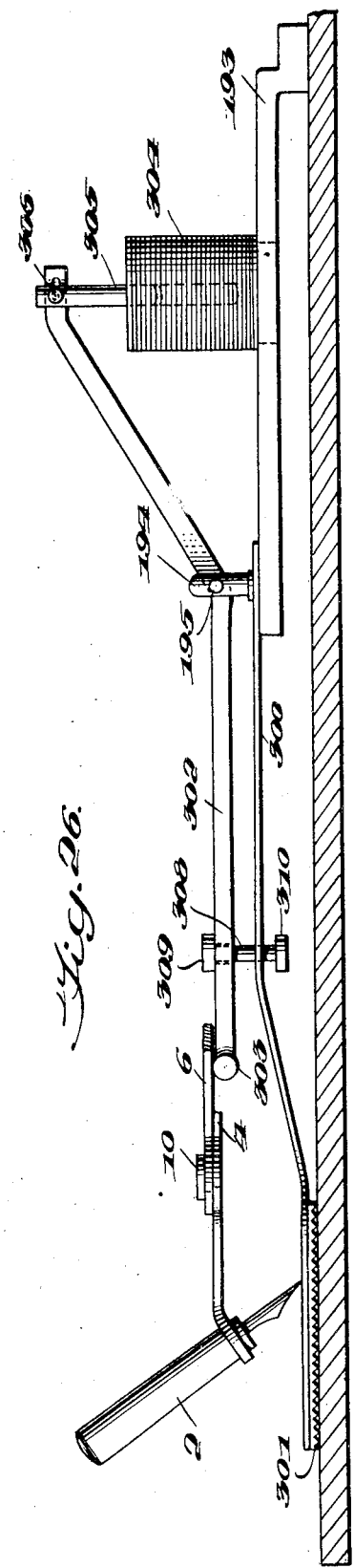
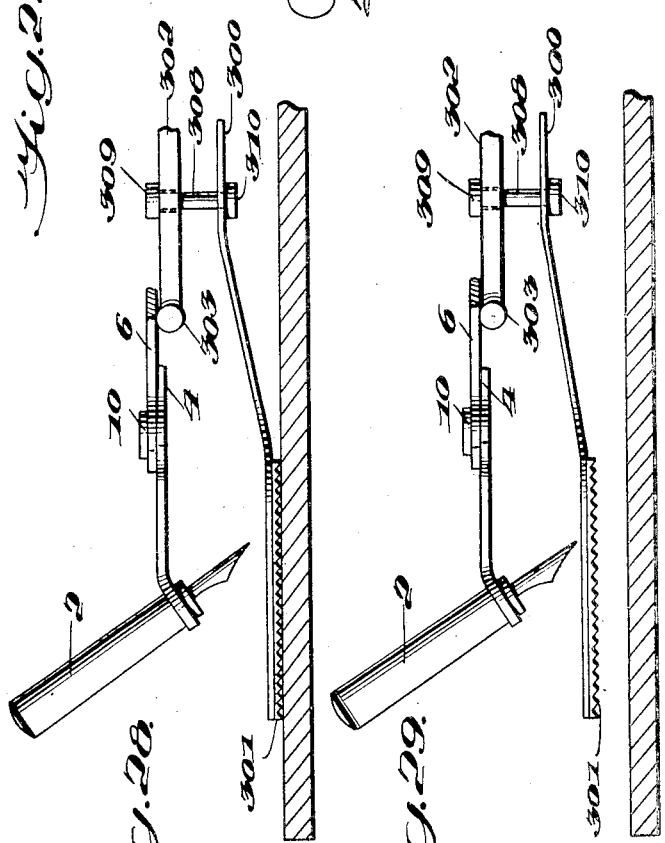
Inventors
LOUIS H. GLASSMAN,
CLARENCE W. BURGER,
By Doe T. Matfield
Attorney Oct. 26, 1943  L. H. GLASSMAN ET AL  2,332,511
SIGNATURE WRITING APPARATUS
Filed Oct. 5, 1940  15 Sheets-Sheet 12
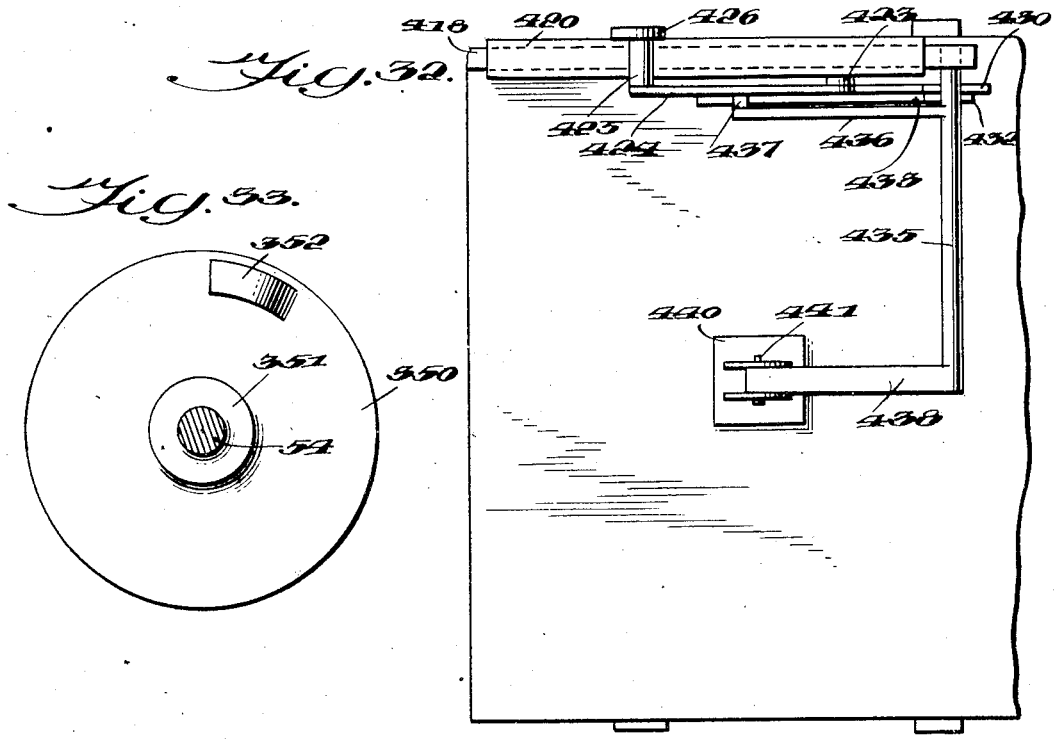
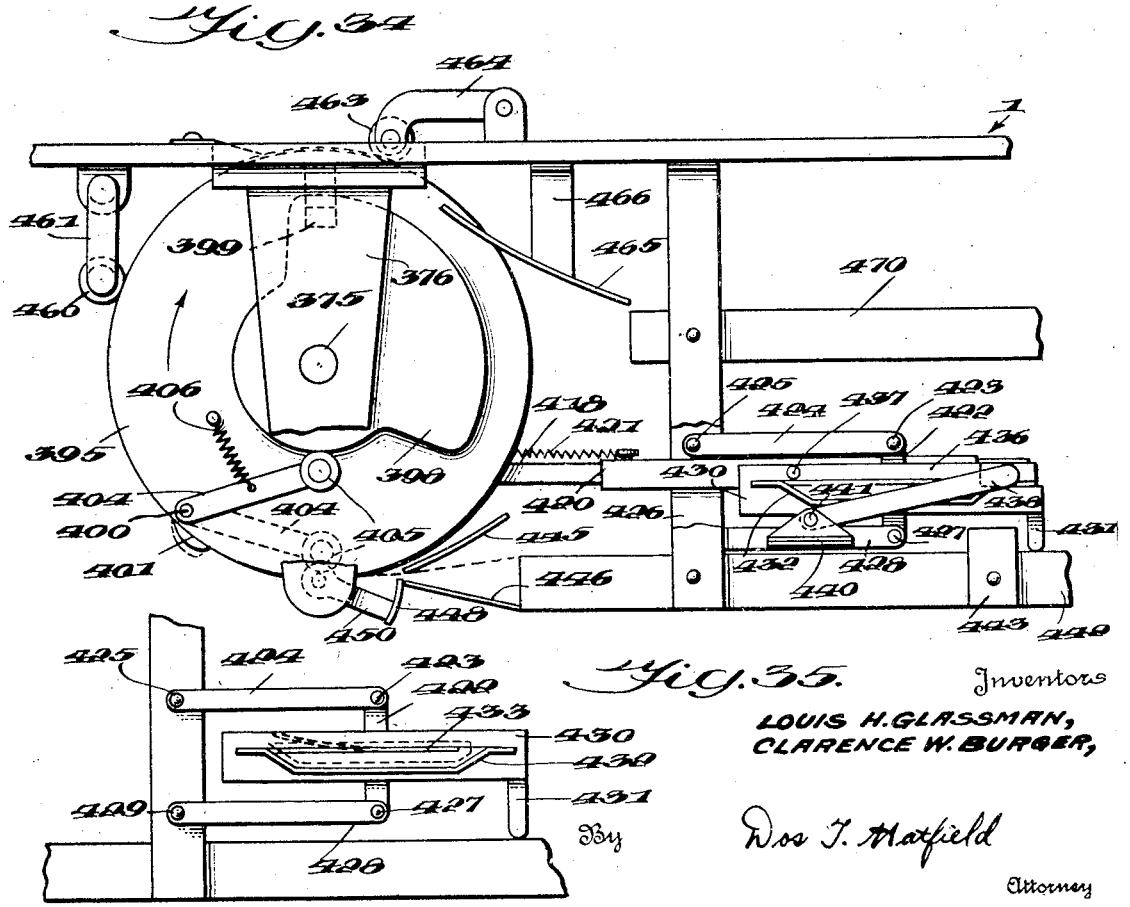
Inventors
LOUIS H. GLASSMAN,
CLARENCE W. BURGER,
By Dos T. Matfield
Attorney

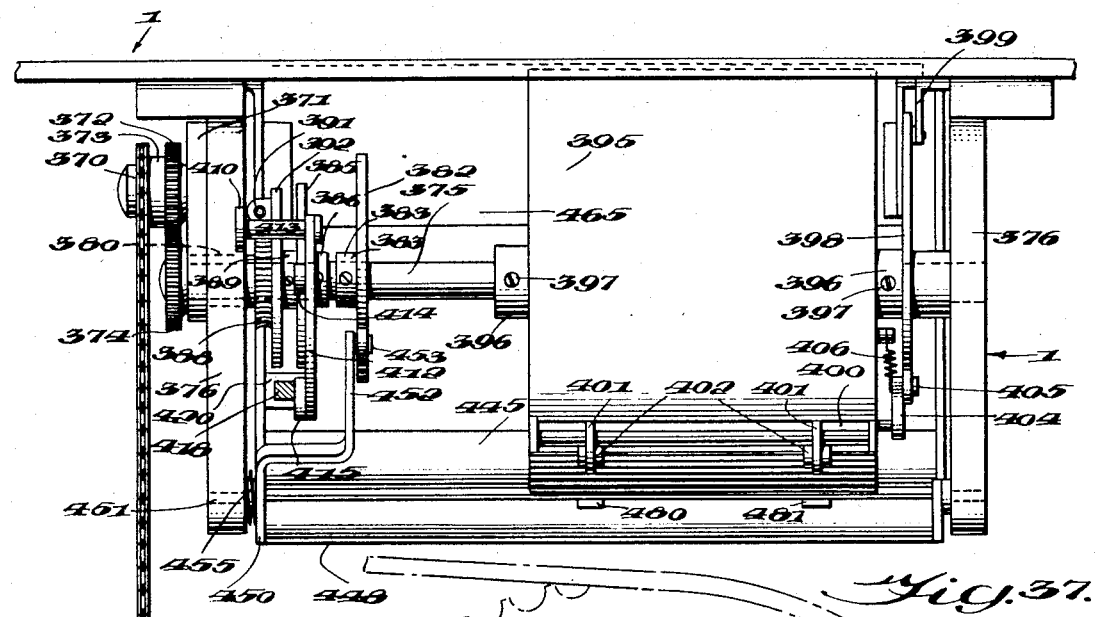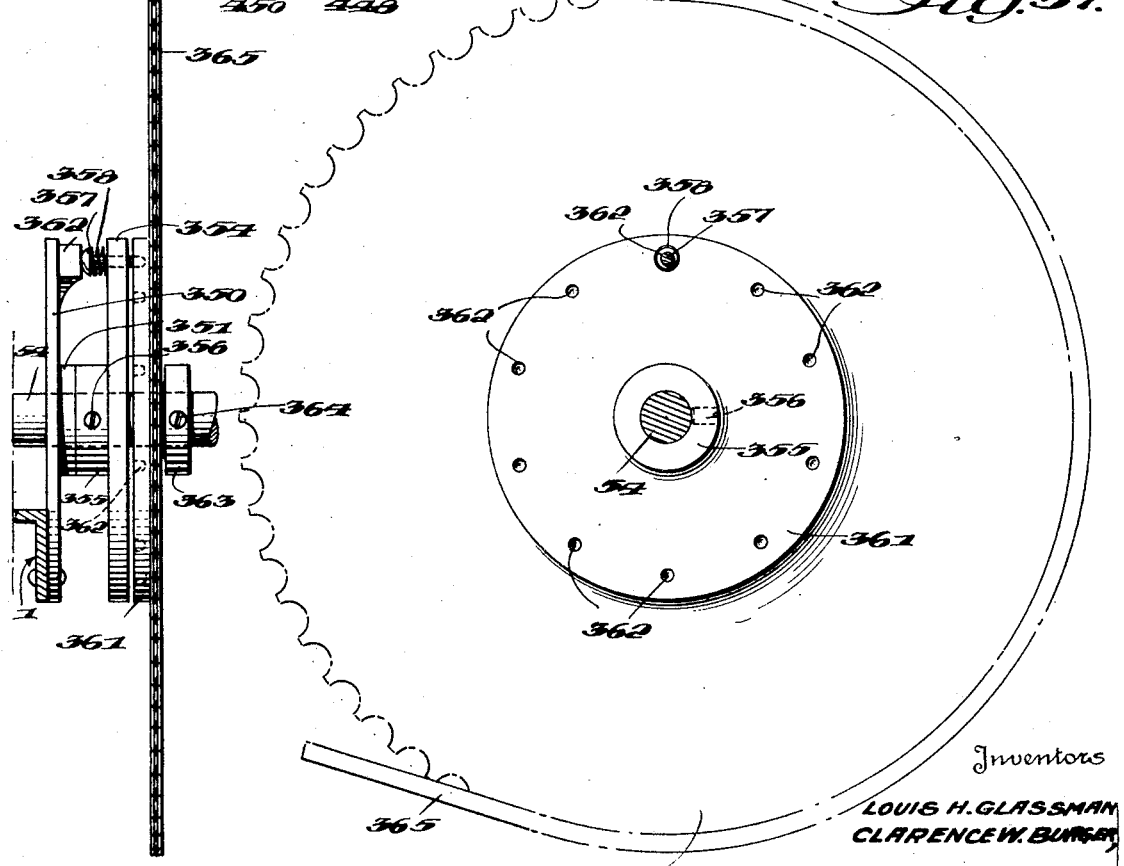

Oct. 26, 1943.    L. H. GLASSMAN ET AL    2,332,511
SIGNATURE WRITING APPARATUS
Filed Oct. 5, 1940    15 Sheets-Sheet 14
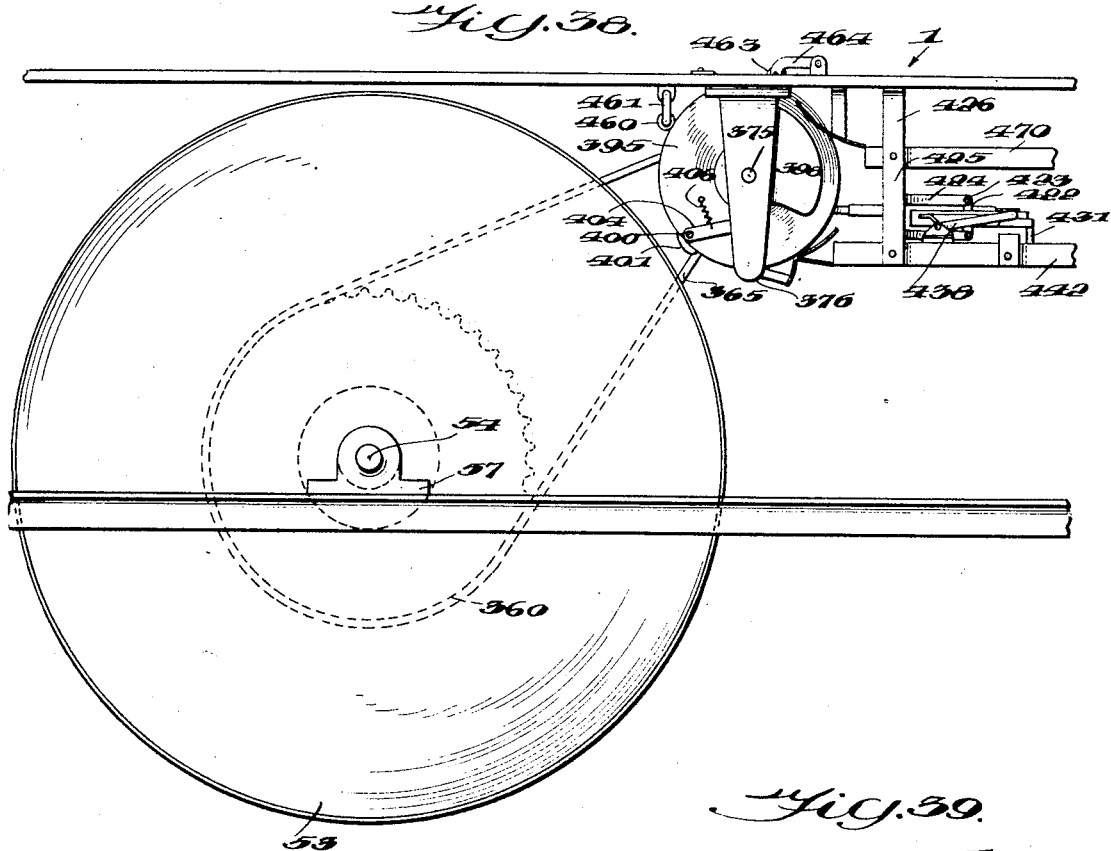
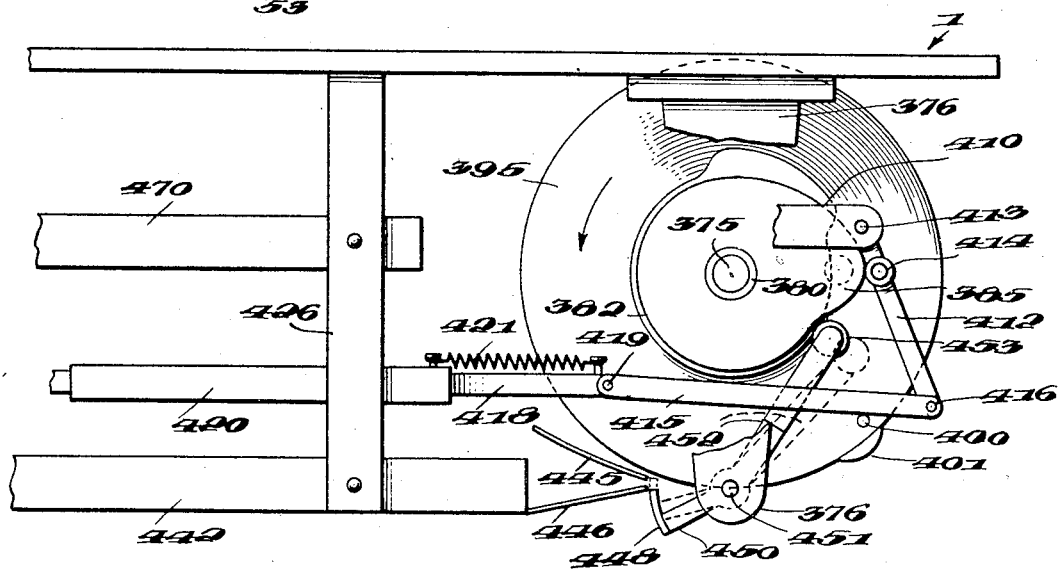
Inventors
LOUIS H. GLASSMAN,
CLARENCE W. BURGER,
By  Dos T. Hatfield
    Attorney

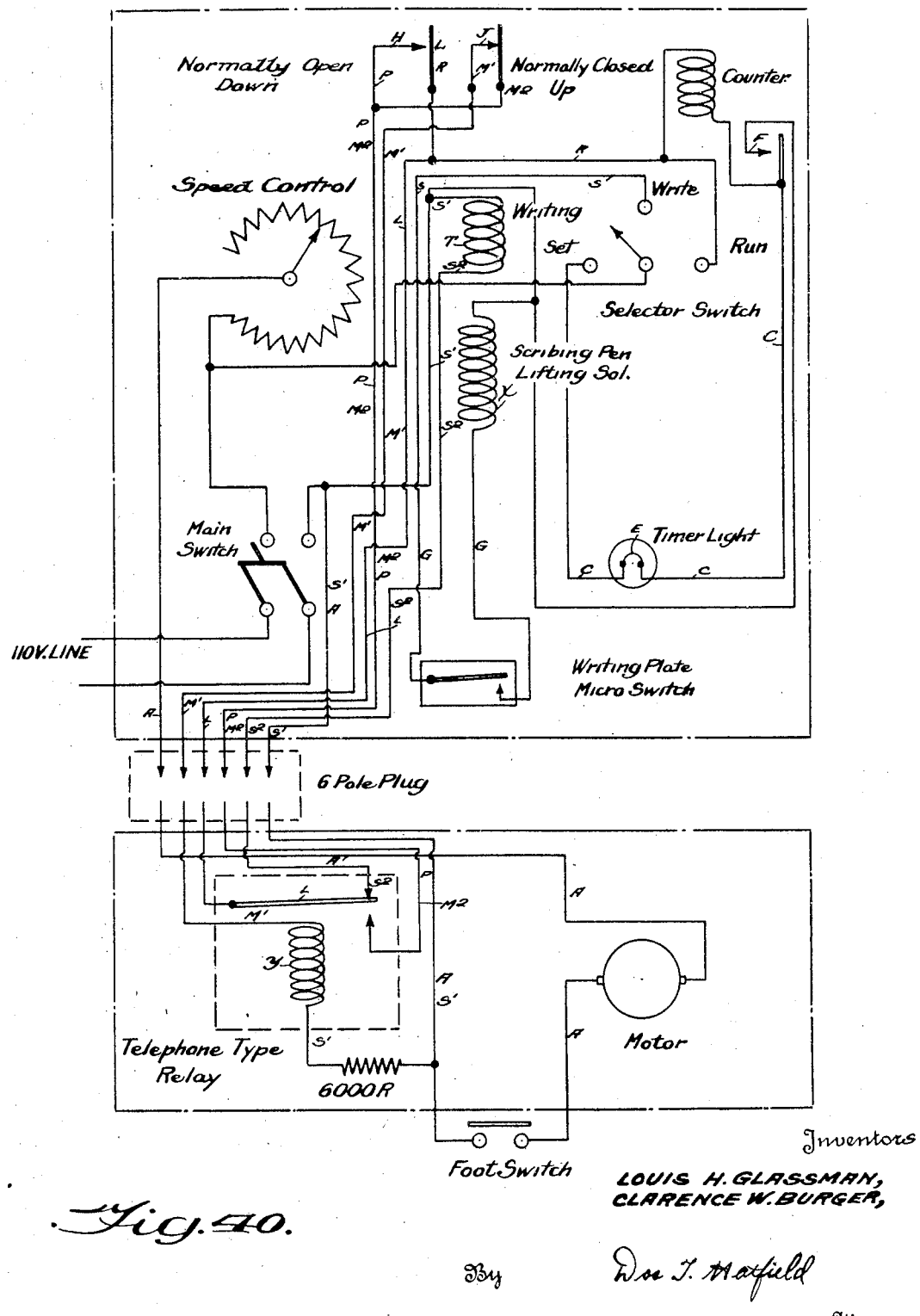

Patented Oct. 26, 1943

2,332,511

UNITED STATES PATENT OFFICE 2,332,511

SIGNATURE WRITING APPARATUS

Louis H. Glassman, East Falls Church, and Clarence W. Burger, Arlington, Va., assignors to Edward Costigan and Robert B. Swope, both of Washington, D. C., and Dos T. Hatfield, Arlington, Va., trustees for the stockholders of Autopen Corporation Application October 5, 1940, Serial No. 359,980

26 Claims. (Cl. 33—18)

This invention relates to the mechanical reproduction of line forms such as are produced with a scribing implement, and while comprehending the reproduction of miscellaneous types of line forms, is primarily concerned with handwriting, such as signatures, which must be reproduced with exceeding accuracy in order to preserve the individual characteristics of the writer.

One primary object of the invention is to provide a machine for producing permanent records of the movement of a scribing implement in forming or tracing signatures or other line forms from which reproductions can be made.

An equally important primary object of the invention is to provide a machine wherein the records are employed to control movement of a scribing implement in reproducing signatures or other line forms.

A further primary object of the invention is to provide a single machine which will perform the dual functions of making records of and reproducing signatures or other line forms.

The inventive apparatus includes a scribing element such as a pen which is freely movable under the normal guiding movement of the hand horizontally in all directions over a scribing plane and which can also be raised and moved from one part of the plane to another throughout scribing movement, as for example in dotting an "i," crossing a "t" and providing a space between the end of one word and the beginning of the next. A traveling record band is provided, preferably endless, together with a pair of spaced record-engaging elements movable reciprocally in fixed paths at different transverse areas of the record band crosswise of the direction of travel thereof. Through carefully designed operating mechanism, scribing movement of the manually guided pen produces dual sinuous record tracks on the traveling band. The two record tracks, while representing the same movements of the pen and being more or less similar in shape, need not be identical and will not be identical with the use of the preferred form of operating mechanism for translating movement of the pen into movement of the record-engaging elements, in view of the differential in position of the paths of movement of the latter in relation to the area of movement of the pen.

It is essential, of course, particularly in the case of recording writing, that the motion translating mechanism shall function easily and at usual writing speeds so as not to interfere with the free and natural movement of the hand in guiding the pen, as otherwise the writing and the recording will not represent the normal handwriting of the individual. It is equally important that the motion translating mechanism shall be extremely sensitive to the least movement of the pen in any direction in order that the recording may be entirely accurate and capable of reproducing the writing without distortion and in exact character. A particular object of the invention is to provide a motion translating mechanism satisfying these requisites.

A record must be made to show the points when the pen is lifted from the scribing plane and again lowered. It is an object of the invention to provide automatic means controlled by the pen for this purpose and as hereinafter explained the same may take several forms. Such means is necessarily so designed as to work in conjunction with the translating mechanism since the pair of record-engaging elements must be moved to new positions during the periods when the pen, after being lifted, is shifted and again lowered to the scribing plane in a new position.

To facilitate recording, it is found desirable to incorporate various additional features in the machine. Provision is made of means coordinated in operation with the travel of the record band to indicate when the scribing movement of the pen should be commenced so that the recording will begin at a predetermined point on the band, and when the scribing movement should be finished so that the recording of the complete writing will extend over a selected length of band. In one of its several forms, such means may function to show the proper writing speed for any speed of travel of the band so that the writing may be timed to suit the purpose just mentioned, and so as to insure that the record tracks will take the form of relatively gradual sinuous lines which are better calculated to insure accurate reproduction than sharp curves. Provision is further made of means for varying the speed of travel of the record band to coordinate the same with the varying writing speeds of different persons, so that writings at varying speeds and/or varying lengths may be recorded over a given length of band.

The provision of the dual record tracks on the record band serves to provide an accurate control of a pen through which the latter may be moved horizontally in all directions lengthwise, transversely and diagonally, each record track serving to guide the pen in all such movement in cooperation with the other track. The fact that the two record tracks are each of a form to produce the same movement of the reproducing pen makes greater accuracy of reproduction, and is of particular help in this respect where, as is possible with the inventive machine, reproduction is carried out at higher operating speeds than the original writing speed.

For reproducing operation, the same translating mechanism is employed as in recording, in this case, however, being actuated by record-engaging elements under control of the record band and serving to operate the pen for reproducing the recorded writing. By utilizing an endless record band, a writing such as a signature may be reproduced thousands of times within the space of an hour. Suitable automatically controlled means is provided to raise and lower the pen at the proper times, working in cooperation with the translating mechanism so that the reproduction is automatic in every respect.

To facilitate reproducing operation, various additional features of the invention may be incorporated in the machine which enable high speed operation. Means may be provided to hold the paper during reproduction of the writing thereon and then to automatically release the same when the operation is completed. Cooperating with such means may be automatic paper ejecting means which will discharge the paper from the operating area of the pen after a writing has been reproduced thereon, preparatory to the insertion of each new sheet of paper. While high speed operation may be effected with the assistance of an operator to feed successive sheets of paper to and from the recording pen, a completely automatic reproducing machine may be had by the provision of feed means for feeding successive sheets of paper to the recording pen at timed intervals so that the same will be suitably positioned beneath the pen at the beginning of each recording operation and then removed upon the completion of the operation. The feed means is desirably of such character that the writing may be adjustably positioned at any selected location of the paper sheets, this feature being particularly important in order that letters of varying length, checks, etc., may have a signature scribed thereon by the machine in correct position. The feed means must operate in synchronism with the speed of travel of the record band and provision is made for varying the speed of the band and feed means so that reproduction may be effected at any selected speed.

The foregoing and further objects and features of the invention will become apparent from the following detailed description and the appended illustrative drawings. In such drawings:

Figure 5 is an enlarged section taken on line 5—5 of Figure 2;

Figure 11 is a top plan view of the writing plate showing the preferred form of timing the original writing which is to be recorded, said latter mechanism being shown in dotted lines;

Figure 12 is a sectional view of Figure 11;

Figure 13 is a detailed plan view of a modified form of actuating means for raising the reproducing scriber during reproduction of a writing;

Figure 14 is a detailed plan view of a modified form of recording the lifting movement of a stylus during the recording of a writing;

Figure 15 is a sectional view of Figure 13, showing a modified form of actuating means for raising the reproducing scriber;

Figure 16 is a sectional view of Figure 14 of a modified form of recording the lifting movement of a stylus during the recording of a writing on the record band;

Figure 17 is a detailed end view of Figure 8 showing a form of actuating means for raising the reproducing scriber during reproduction of a writing;

Figure 18 is a sectional view of Figure 17 showing a modified form of actuating means for raising the reproducing scriber;

Figure 19 is a detailed sectional view of the actuating lugs shown in Figure 18;

Figure 20 is a sectional view of actuating means for the paper clamp;

Figure 21 is a sectional view of a modified form of our invention of actuating means for raising and lowering the reproducing scriber and the paper clamp;

Figure 22 is a detailed end view partly in section of Figure 21;

Figure 23 is a detailed end view partly in section of Figure 21;

Figure 24 is a detailed side elevation showing the mechanism for removing paper, and showing parts of a modified form of mechanism for raising and lowering the reproducing scriber and paper clamp, other parts of the latter being broken away;

Figure 25 is a detailed top plan view of the structure shown in Figure 24;

Figure 26 is a detailed side view of a modified form of our invention for raising and lowering the reproducing scriber and the paper clamp;

Figure 27 is a detailed plan view of a portion of the structure shown in Figure 26;

Figure 28 is a detailed side view of a portion of the structure shown in Figure 26, showing another portion of the structure;

Figure 29 is a detailed side view of a portion of the structure shown in Figure 26, showing still another position of said structure;

Figure 30 is a detailed side sectional view of the writing plate;

Figure 31 is a detailed end sectional view of the writing plate;

Figure 32 is a detailed plan view of a portion of the mechanism for feeding paper to the reproducing scriber;

Figure 33 is a detailed side view of the actuating cam and wheel for actuating the paper feeding and ejecting mechanism;

Figure 34 is a detailed side view of the mechanism for feeding paper to and ejecting paper from the reproducing scriber;

Figure 35 is a detailed fragmentary view of a portion of the paper feeding mechanism;

Figure 36 is a detailed end view of the paper feeding and ejecting mechanism;

Figure 37 is a detailed side view of the driving mechanism for the paper feeding and ejecting structure;

Figure 38 is a detailed side view of the paper feeding and ejecting mechanism;

Figure 39 is a detailed side view of a portion of the paper feeding and ejecting mechanism;

Figure 40 is a diagrammatic view of the wiring for portions of the electric system.

Figure 1:
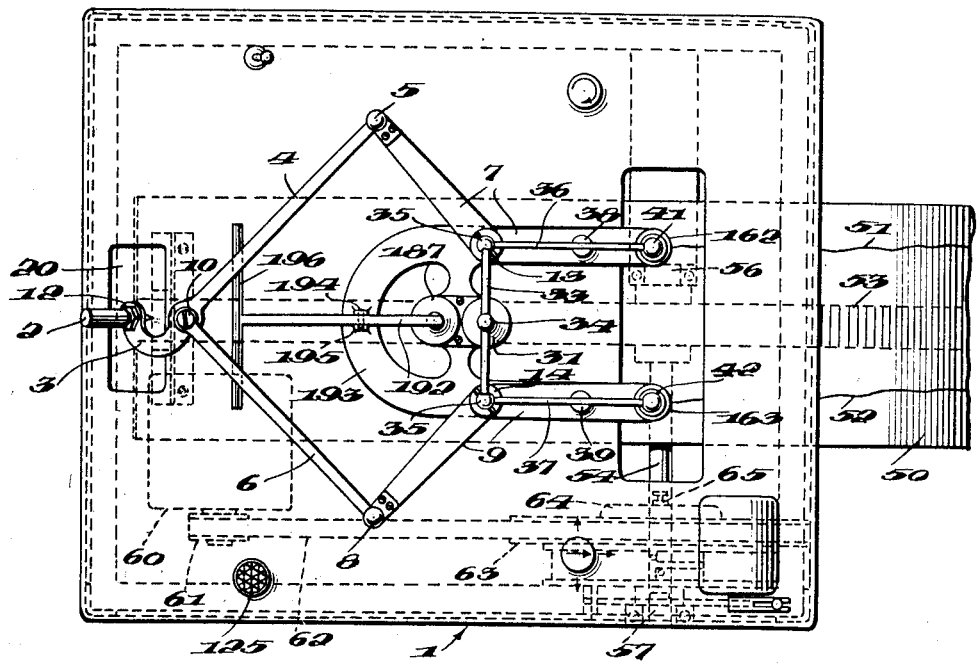
Figure 1 is a top plan view of our invention.

Referring now to the drawings, reference numeral 1 generally indicates the cabinet, which may be of any suitable construction. The scriber, or pen, is indicated at 2, and is connected to a link arm 4 having a curved extension 3. The only purpose of the curve in said extension is to enable the operator to view his writing at the time of recording the signature. The link arm 4 is pivotally connected to pivot arm 7 by means of a pivotal connection 5, which connection is of the ball joint type so as to provide universal movement. Link arm 6 is pivotally connected to pivot arm 9 by means of pivotal connection 8, the same being identical with pivotal connection 5. It will be noted that arm 4, pivotal connection 5 and pivot arm 7 are identical in structure to link arm 6, pivotal connection 8 and pivot arm 9, the only distinction being the curved extension portion 3 of link arm 4. Link arm 6 is pivotally connected to link arm 4 by means of pivot stud 10.

The scriber 2 is mounted in an aperture formed in the curved extension 3 of link arm 4, and is secured therein by means of holding nuts 12.

Link arms 7 and 9 are supported by and swing about stationary pivot studs 13 and 14 respectively. Marking pens 16 and 17 are inserted through hubs 162 and 163, which hubs are located at the ends of arms 7 and 9 and are supported by said arms to move in fixed paths.

When the scriber 2 is moved in any horizontal direction, the marking pens 16 and 17 will move in fixed paths across a moving record band 50, and as the marking pens 16 and 17 are in contact with said record band, lines 51 and 52 will be drawn on the band. These lines represent the recorded movement of the scriber 2. Because of the delicacy of writing movement, the mechanism which transmits the movement of the scriber 2 to the marking pens 16 and 17 must be positive in its nature, and, also, must be light and freely movable, so that there will be only the slightest amount of drag on the scriber 2. Otherwise, a person recording his signature would not have normal freedom of movement with the scriber 2, and the writing could not, therefore, be natural.

The ball or universal joints 5 and 8 are provided to enable the scriber 2 to be lifted out of the horizontal plane, and not interfere with the marking pens 16 and 17. This lifting movement, of course, is made when the scriber 2 is raised to dot an "i" or cross a "t," or upon the completion of one word to begin another word.

For the purpose of recording the raising or vertical movements of the scriber 2 on the record band 50, we have provided a writing plate 20 (see particularly Figures 30 and 31), which fits into recesses formed in the frame 1. A bracket 21, secured to the underside of the frame 1, extends downwardly and carries therewith a thumb screw 22, which screw is threaded through locking nuts. A tension spring 23 has one end thereof secured to the thumb screw 22 and has its opposite end thereof secured to a connecting angle 24, the angle in turn being connected to the underside of plate 20. Micro-switches 25, one being located on each end of the underside of the writing plate 20, are secured to the bracket 21 by means of a nut and bolt assembly 26, the bolt in turn being inserted through a slotted aperture 27. These micro-switches 25 have buttons 28 extending upwardly into contact on the underside of writing plate 20. The tension of the tension spring 23 is so adjusted as to be almost equal to the upward force of the buttons 28 of the micro-switches 25, although it will be understood that the buttons exert a slightly greater upward force than the tension spring 23. When writing, the point of the scriber 2 will exert a slightly downward pressure on writing plate 20, which pressure, even although slight, will be sufficient to overcome the slight upward differential pressure exerted by the buttons 28. Thus, when the point of the scriber 2 is in contact with the writing plate 20, the buttons 28 will be forced downwardly so as to operate the micro-switches 25. These micro-switches are adapted to complete a circuit to a solenoid 31, which is mounted at the top of the table in any suitable manner. The solenoid 31 has a plunger 32 operating therein. A yoke 33 is secured to the plunger 32 by means of a cap 34, the end of the yoke having caps 35 mounted thereon to form rigid connections with rocker arms 36 and 37. These rocker arms are supported on fulcrums 38 and 39, and are pivoted thereto by means of pivot pins 40. Rocker arms 36 and 37 have rounded ends somewhat in the form of balls 41 and 42. The marking pens 16 and 17 extend upwardly through the hubs 162 and 163 of arms 7 and 9, the upwardly extending portions being barrels 45 and 46 of the marking pens 16 and 17. These barrels 45 and 46 have shoulders 47 and 48. Coil compression springs 43 and 44 encircle the barrels and seat upon the top portions of hubs 162 and 163, and bear against the shoulders 47 and 48, to thus constantly urge the marking pens 16 and 17 upwardly. Thus, when the scriber 2 is raised to dot an "i," cross a "t," or for any other purpose, the scriber does not exert pressure on the writing plate 20. Therefore, the buttons 28 will move upwardly thus breaking the contact through the micro-switches 25, and hence the solenoid 31. When the circuit is broken to the solenoid 31 the plunger 32 will drop, thus permitting rocker arms 36 and 37 to rock about their fulcrums 38 and 39, thereby permitting the springs 43 and 44 to raise the marking pens 16 and 17 out of contact with the record band 50. As the record band is moving by means which will presently be described, a space will occur on the record band wherein no lines will be drawn, thus indicating that the scriber 2 has been raised from the horizontal writing plane.

A modified mechanism for recording the lifting of the scriber for any purpose whatsoever is shown in Figures 14 and 16. In this form a solenoid 100 is mounted on frame 1, and has a plunger 101 operating therein. A marking pen 102 is secured in any suitable manner to the plunger 101. The solenoid 100 is mounted on a plate 103, the plate being secured to the top of the cabinet 1 by means of thumb screws 104. This mechanism would do away with the solenoid 31, yoke member 33 and rocker arms 36 and 37, etc., and the marking pens 16 and 17 would be in contact with the tape 50 at all times. The operation of this form of device for recording the lifting of the pen is as follows: When the point of the scriber 2 is placed on the writing plate 20, the micro-switches complete a circuit to solenoid 100 so as to retract the plunger 101, thus lifting the marking pen 102 from the band. Assuming that the pen is lifted from the writing plate to dot an "i" or cross a "t" or the like, the circuit would be broken to solenoid 100, thus allowing the plunger 101 to be forced downwardly by means of a coil spring or the like, which operation in turn would lower the marking pen 102 into contact with the band 76. As the band will be revolving at a constant speed, a straight line will be marked on the band for the duration of the time that the scriber 2 is not on the writing plate 20. This line will indicate the length of time that the scriber 2 has been lifted, and thus permit operation of one of the many ways, which will presently be described, for lifting the scriber 2 from the writing plate when the machine is reproducing the recorded signature.

A record band 50, which may be formed of vinylite or other suitable composition, moves underneath the marking pens 16 and 17, so that the pens may draw lines thereon. The record band 50 is rigidly supported throughout on the periphery of wheel 53. This will prevent vibration of the record band during movement, and, of course, vibration must be excluded if the machine is to operate with minute accuracy. The wheel 53 is rotatably mounted on shaft 54, the wheel 53 having a suitable hub 55 and shaft bearings 56 and 57. The bearings are mounted on the frame generally indicated at 1 in any suitable manner.

Figure 6:
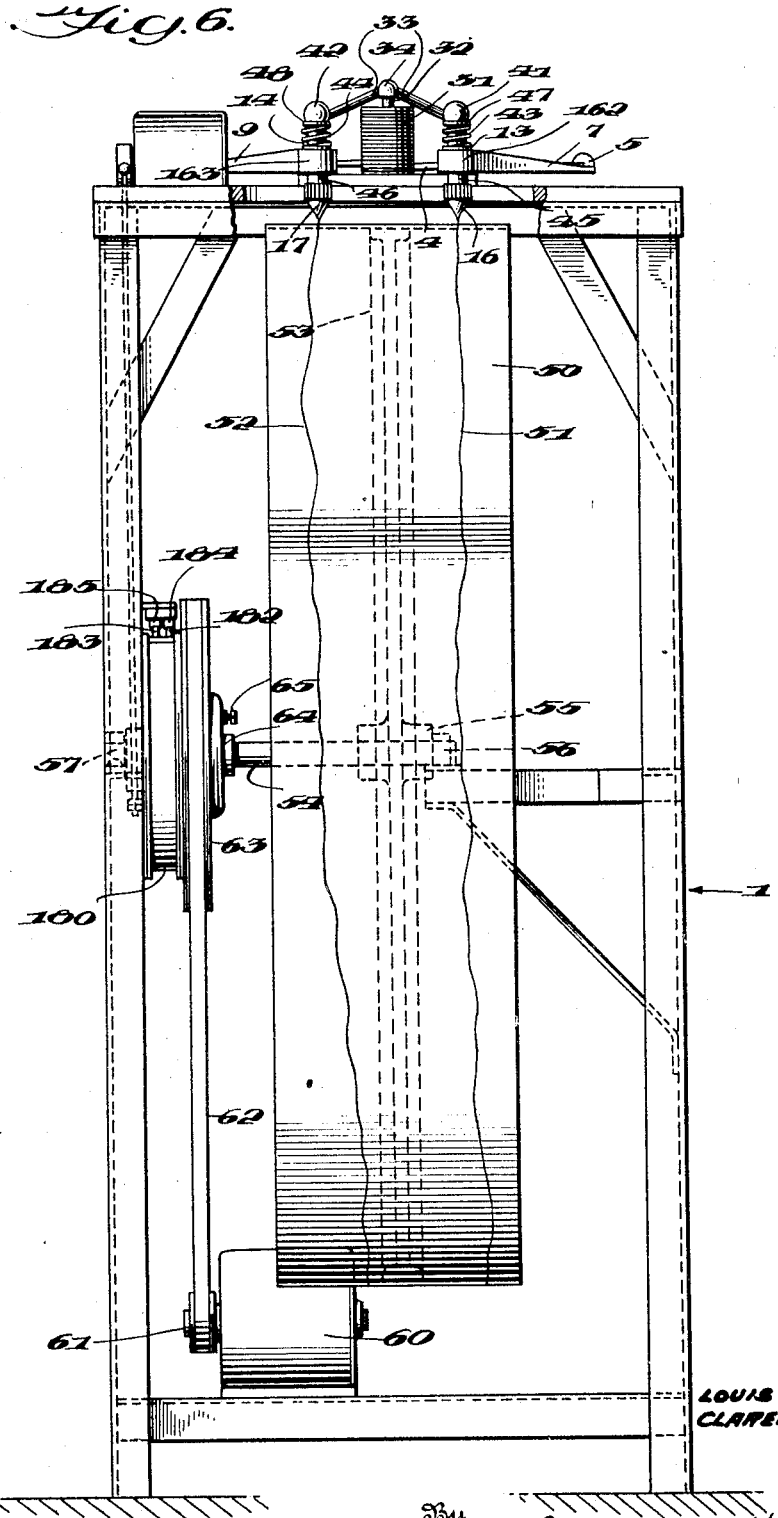
Figure 6 is an end elevation of the mechanism shown in Figure 1.

An electric motor 60 is supported on the bottom portion of the framework 1 and is provided with the usual pulley 61, driving belt 62, the driving belt in turn being adapted to drive pulley 63. Pulley 63 is also rotatively mounted on shaft 54, although the same is free of the shaft. A clutch member 64 is keyed or otherwise fixed to shaft 54. If the pin 65 is pulled outwardly as shown in Figure 6, the pulley 63 will revolve freely about the shaft 54. However, when the pin 65 is pushed inwardly, it will lock the clutch member 64 with pulley 63 so that upon rotation of the pulley 63, the shaft 54 will be rotated through the medium of the clutch.

Figure 8:
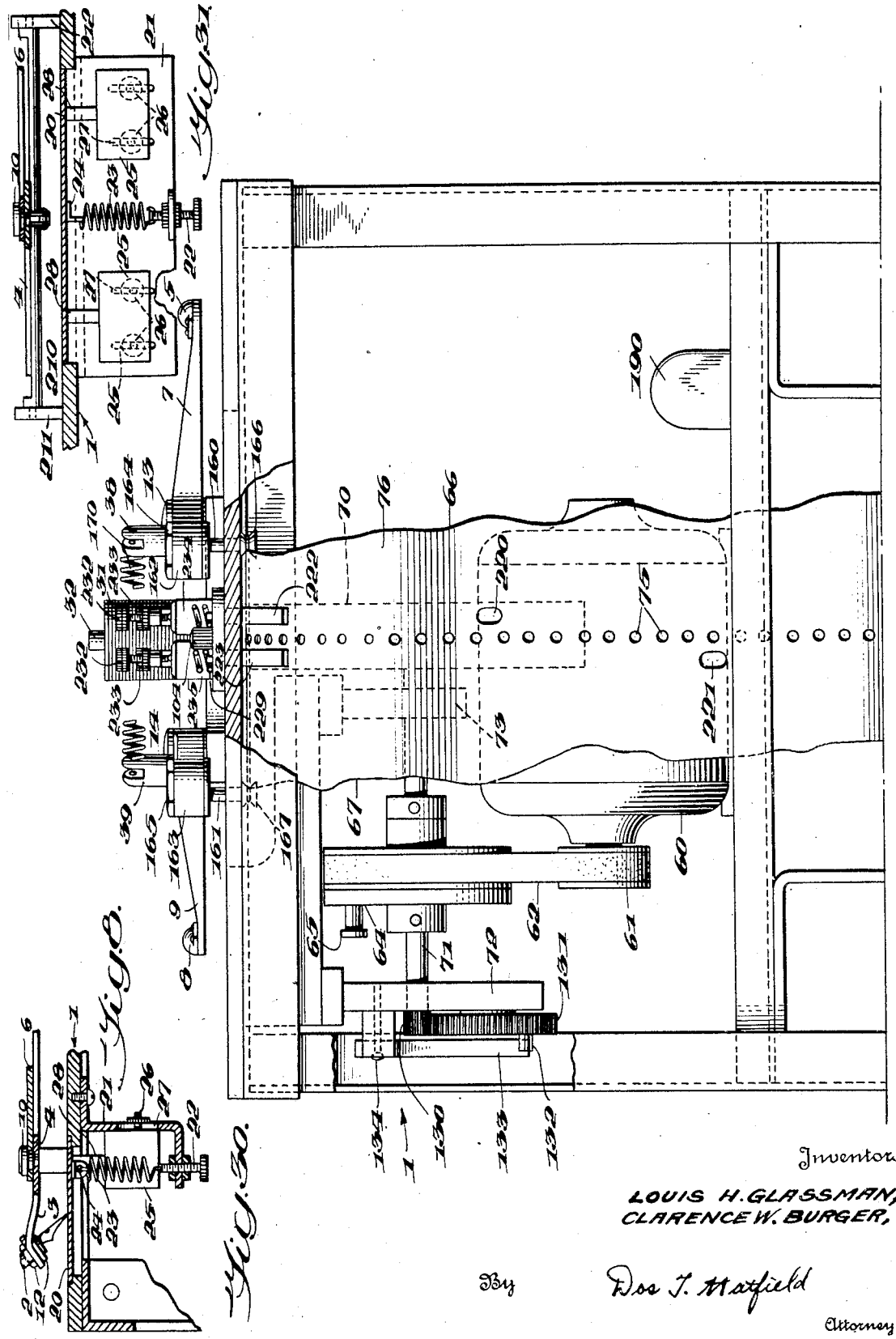
Figure 8 is an end elevation of our invention showing a modified form of supporting the record band.
Figure 10:
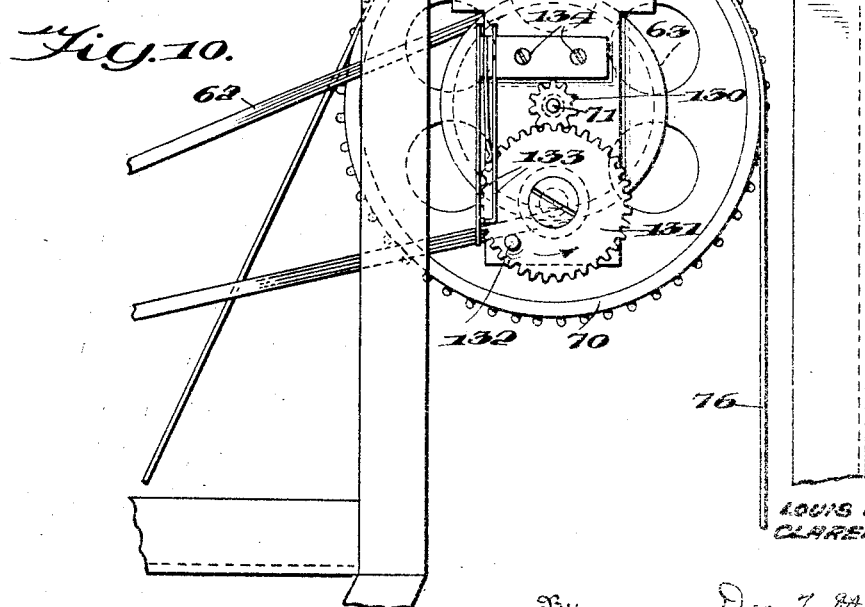
Figure 10 is a side elevation of Figure 9, with parts broken away.

A modified form of supporting the record band is shown in Figures 8 and 10, where, instead of providing a single wheel for the record band a sprocket wheel 70 is adapted to drive the record band 76 by means of the perforations 75 therein. This sprocket wheel 70 is rotatably supported on shaft 71, the shaft in turn being supported by hanger blocks 72 and 73, the hanger blocks in turn being supported in any suitable manner on the frame 1. The record band 76 will have suitable take-up and idle rollers mounted in the lower portion of the framework 1 (not shown). In this modification the driving means for the sprocket wheel 70 is similar to that shown for the wheel 53. (See particularly Figure 8.)

Figure 7:
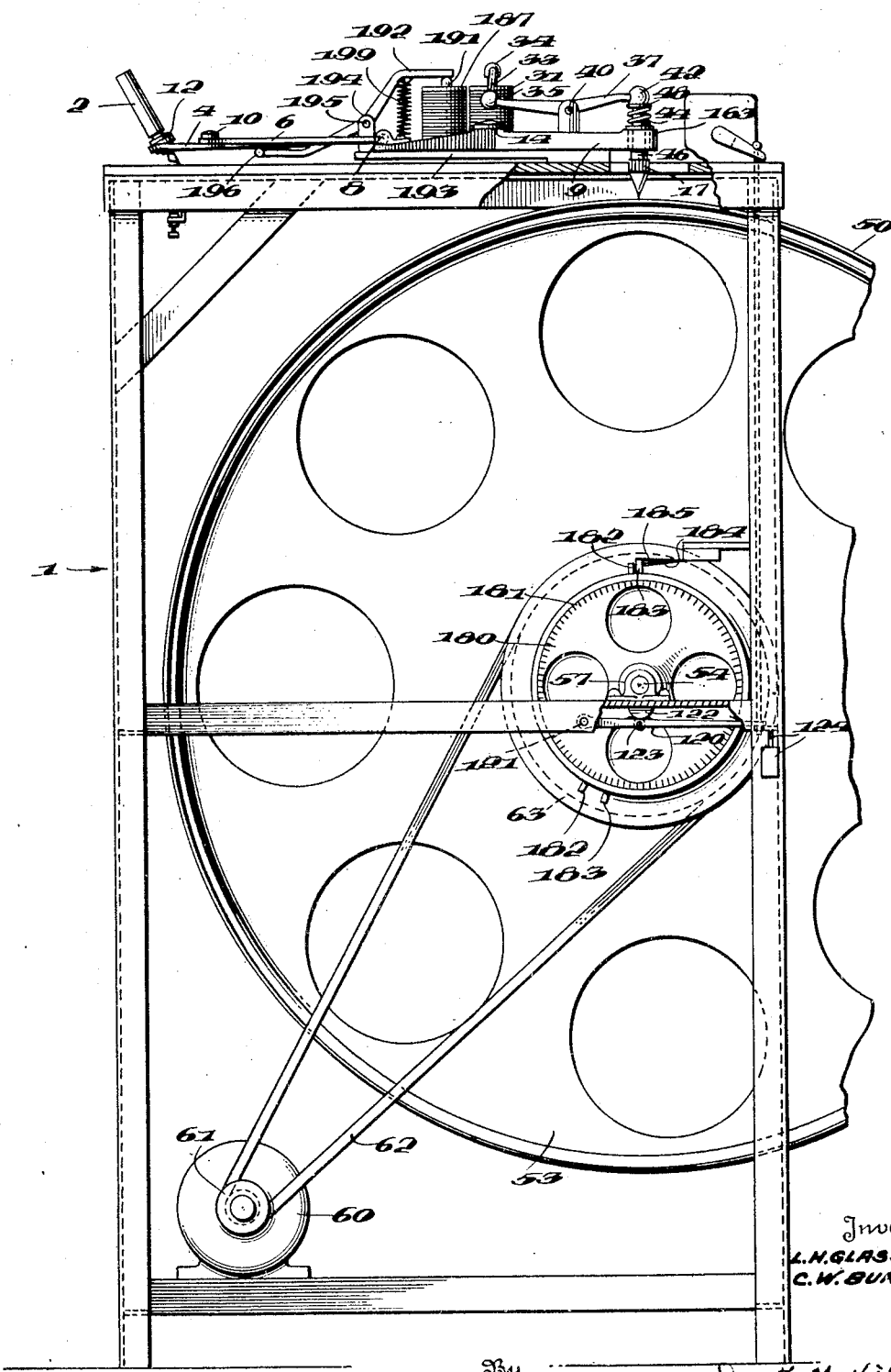
Figure 7 is a side elevation of the structure shown in Figure 1.

A timing device shown in Figures 11 and 12 is arranged to cast a shadow upon the writing plate 20, so that the person whose signature is to be recorded may practice writing his signature so as to write the same within a certain length of time. Also, this timing device will function to indicate when the scribing movement of the pen should be begun, so that the recording will begin at a predetermined point on the band, and when the scribing movement should be finished so that the recording of the complete writing will extend over a selected length of band. Also, the particular feature about to be described will function to show the proper writing speed for the scriber 2 for any speed of travel of the record band, so that the writing may be timed to suit the purpose just mentioned, as well as to insure that the record tracks will take the form of relatively gradual sinuous lines. This device, as shown, consists of a bulb 140 mounted in a reflector box 141, the same being secured to the underside of the writing table so as to illuminate the writing plate 20, which may be formed of ground glass or the like. A disc 143 has a plurality of flat fingers 142 projecting radially therefrom, said fingers being adapted to be positioned between the bulb 140 and writing plate 20, so as to cast a shadow visible through the writing plate. The disc 143 is provided with a suitable hub member 144, and is secured to shaft 145 by means of set screw 146. A gear 147 is keyed or otherwise secured to shaft 145, said gear meshing with worm gear 148. Worm gear 148 is fixed to shaft 149, which shaft is geared either to shaft 54, as shown in Figure 7, or to shaft 71, as shown in Figure 8, depending upon which modification is employed for the support and rotation of the record band. The gear ratio between disc 143 and wheel 53 (as shown in Figure 7), or wheel 70 (as shown in Figure 8), is such as to turn the disc 143 one-fourth of a revolution for a complete revolution of either wheel 53 or record band 76. Thus it will be seen that upon one complete turn of the record band a finger 142 will appear underneath the writing plate 20 adjacent to the lefthand side thereof, and slowly pass underneath the writing plate 20 until the same reaches the righthand portion of the writing plate, during which time the person writing his signature must complete the same. The length of time required to move the finger 142 from the extreme righthand portion of the writing plate to the position shown in dotted lines in Figure 1 is that time necessarily required, in reproducing the signature, to move the scriber 2 from the righthand portion of the writing plate upon the completion of a signature, to the lefthand portion of the writing plate so that the same will be in position to reproduce another signature.

An alternative method of timing the writing of the original signature which is to be recorded is shown in Figures 1 and 7. Referring particularly to Figure 7, a bar 120 is pivotally connected to a fulcrum 121 which is attached to the frame 1 in any suitable manner. A cam 122 is fixed to the shaft 54, and rotates therewith. A roller or ball 123 is inserted in the bar 120 at the point where the cam 122 will hit the bar 120. Upon one complete revolution of the shaft 54, which would also mean one complete revolution of the wheel 53 and the record band 50, the cam 122 will be forced downwardly, at which time the bar 120 will operate a momentary single impulse switch 124, said switch completing the circuit to light 125 (see Figure 1), which light is mounted on top of the framework 1. Thus, the person writing his signature may practice the timing thereof, so that he may complete the same upon one complete revolution of the record band 50, which complete revolution will be signaled to him by the flashing of light 125, as just explained.

In order to vary the speed of travel of the record band during recording, so as to coordinate the same with varying writing speeds of different persons, so that the writings at varying speeds and/or of varying lengths may be recorded over a given length of band, we have provided a rheostat (see Figure 40), which will control the speed of the motor 60 so as to regulate the speed of the rotation of the record band. The person who is writing his signature may control the speed of the record band, by means of the rheostat, to enable him to write his signature or other writing within the same length of time that it takes the record band to make approximately four-fifths of one revolution, the remaining one-fifth revolution being required to return the scriber from the end of one signature, when reproducing, to the start of the second signature, and so on.

In order to insure a complete understanding of the operation of the recording of a signature or other writing, it is thought best to describe the same first by means of the electrical diagram (Figure 40), and thereafter a description of the mechanical drawings. It will be understood at the outset that the electrical diagram is for representative purposes only, and that numerous other types of electrical systems can be employed.

Referring to electrical diagram, Figure 40, the operator closes the foot switch, thereby completing a circuit through motor marked "A." The blank band then begins to revolve at a speed which may be regulated through speed control rheostat marked "B."

A circuit "C" is so connected by means of a selector switch "D" (which is closed to post marked "set") which causes a light marked "E" to flash at every revolution of the record band. This flashing is caused by completion of circuit "C" through the mechanism indicated by "F," a mechanical switch which closes with every revolution of the record band. In this manner, the person who is recording his signature can regulate his writing speed or the speed of the motor to make the two speeds approximately coincide. When he has thus achieved a synchronism of writing speed and record band speed, he is then ready to actually record his signature. He does this by turning selector switch "D" to the post marked "write," thus partially completing circuit "G" which is fully completed only when pressure is placed upon the writing plate, thereby closing the completed circuit through a micro-switch attached thereto. The completion of this circuit "G" will energize the scribing pen solenoid and will thereby cause the scribing pens or the marking pencil, previously noted, to drop upon the record band causing a mark, which is the actual record of the signature. Thus, the selector switch makes it possible to practice writing for synchronization of speeds, and then when this is accomplished, to effect a circuit which will make a recording when the operator is ready.

In the description of the mechanical drawings, we will assume that the person whose signature is to be recorded has timed himself so that he can synchronize the writing of his signature with the speed of the record band. Upon the starting of his signature, the pen point of the scriber 2 will be placed on the writing plate 20, and a circuit will be made thereby to the solenoid 31, through the micro-switches of the writing plate, as previously described. Upon energizing the solenoid 31, the plunger 32 will be forced upwardly, carrying with it the yoke member 33 which in turn will rock the arms 36 and 37 about their fulcrums 38 and 39, thus forcing the marking pens 16 and 17 downwardly counteracting the pressure of the coil springs 43 and 44. Thus, upon the start of the signature, the marking pens 16 and 17 will be forced downwardly so as to contact the revolving record band 50. As the operator moves the scriber 2 in writing the signature, the link arms 4 and 6, and pivot arms 7 and 9 will impart an arcuate motion to the marking pens, and as the record band is revolving thereunder the marking pens impart wavy lines 51 and 52 on the record band, thus each line 51 and 52 records the two components of movement. The arcuate motions of the marking pens 16 and 17 are graphic means of recording the motion of the operator-actuated scriber 2. Any point on the writing plate 20 may be located by the positions of the ends of the arms 7 and 9 through simple geometric transference. If the scriber 2 is held at any point on plate 20, the marking pens 16 and 17 will assume a definite position on the record band 50 with respect to any base line of this record band, such as, for example, its center line. If the scriber 2 is now moved an infinitesimal distance in any direction, the marking pens will move correspondingly in their arcuate motion to record individually two separate points which in turn refer this second position of the scriber 2. A line being a series of points infinitesimally distant from each other will thus give a series of infinitesimal spaced points at the marking pens 16 and 17. Further, a line being a continuity of points, the points obtained on the record band are therefore continuous, thus giving a line under each of the pens 16 and 17. These two lines thus obtained are a graphic recording of the motions of the scriber 2. Any two instantaneous points of these two lines 51 and 52 reflect a definite instantaneous position of the scriber 2.

As soon as the writer lifts the scriber 2 from the writing plate 20 to dot an "i" or cross a "t," or upon the completion of one word or name, the circuit to the solenoid 31 is broken through the medium of micro-switches under the writing plate 20. When the circuit is broken to the solenoid 31 the plunger 32 will drop downwardly, thus forcing the rocker arms 36 and 37 to rock about their fulcrums 38 and 39, thus relieving the pressure exerted on the collars 47 and 48 of the marking pens 16 and 17. The compression of the springs 43 and 44 will thus force the marking pens upwardly out of contact with the record band 50. As the record band will continue to revolve, there will not be any lines on the record band while the pens 16 and 17 (also scriber 2) are lifted. Upon the crossing of the "t" or the dotting of an "i" the scriber 2 will again contact the writing plate, thus through the micro-switches of the writing plate, make the circuit to the solenoid 31, which, through the operation previously described, will again force the marking pens 16 and 17 into contact with the record band 50.

It will be understood that the operation above described will take place whether the support for the record band is in the form of a single wheel 53, as shown in Figures 1, 6 and 7, or whether the same is in the form of the sprocket wheel 70, as shown in Figures 8 and 10. Also, it will be understood that the modified form recording the lifting of the pen, as shown in Figures 14 and 16, previously described, may be used.

Assuming now that the master or original signature has been written, the marking lines 51 and 52 each will have recorded the two horizontal components of movement. If the mechanism shown in Figures 1, 6 and 7 is used to record the vertical movement of the scriber 2 (that is, the movement made by the scriber when the same is lifted from the writing plate), these lines 51 and 52 will be interrupted upon each lifting of the scriber. However, if the mechanism shown in Figures 14 and 16 is utilized to record the vertical movement of the scriber, then the marking pens 16 and 17 would have to be in contact with the record band at all times, and the lines 51 and 52 will be continuous. However, the marking pen 102 would have made a line, preferably in the center of the record band, which line would record the vertical movement of the scriber and the length of time that the scriber was not in contact with the writing plate.

In order to reproduce the signature written, the record band 50 or 76 is removed from the machine, and the same is cut along the marking lines 51 and 52. After the record band has been cut along these lines, edges 66 and 67 will be formed on each side thereof. The band is then positioned about either the wheel 53 or sprocket wheel 70, in accordance with the particular form of the invention used, and the marking pens 16 and 17, together with the springs 43 and 44, rocker arms 36 and 37 and yoke 33 are removed from the machine. In lieu of the marking pens 16 and 17, follower pins 160 and 161 are inserted in hubs 162 and 163 of arms 7 and 9. These pins are secured in hubs 162 and 163 by means of locking nuts 164 and 165, which are threaded on pins 160 and 161. The upper portion of pins 160 and 161 fit concentrically into hubs 162 and 163. However, the extension of the pins are eccentric to the upper portion so as to be eccentric to the hub openings, as seen in Figure 8. The pins 160 and 161 have rotatable wheels 166 and 167 mounted thereon, said wheels being substantially V shaped in cross-section. These wheels 166 and 167 are positioned so as to follow the edges 66 and 67 of the record band. Because of the particular mounting of the pins 160 and 161 in hubs 162 and 163, the point of contact of the edges 66 and 67 of the tape 76 is in the same vertical plane as the center of the hub openings. This point, therefore, is exactly the same point in relation to the hubs as the point of contact of the marking pens 16 and 17 with the band when recording. It should be understood, at this point, that in lieu of the substitution just described, the marking pens 16 and 17 could be so formed as to act as followers, and in such event they would not be removed from the hubs. A tension spring 170 is secured to the fulcrum posts 38 and 39, so as to hold the followers to the edges of the record band. As the band rotates, the followers will move back and forth in the same arcuate movement originally made by the marking pens 16 and 17, and the arms 7 and 9, 3 and 4, will impart the movement to the reproducing scriber. The movement of each element in reproducing the signature is the same as the movement originally made when the signature was being recorded. The only distinction between the two operations of recording and reproducing, is that when recording, the scriber imparts the inertia, while when reproducing, the band imparts the inertia. Thus, it will be seen that the two horizontal components of movement are imparted to the reproducing pen, which pen is inserted in the aperture of the curved portion 3 of arm 4. Several ways are shown for lifting the reproducing scriber during the reproduction of the signature, as will be hereinafter described.

We have shown four means for raising and lowering the scriber during the reproduction, and each of these means have one or more modifications. In previously outlining this structure, the one means for raising the scriber consists of holes in the record band, a second means of lifting the scriber consists of an electrical commutator disc (two positions of lugs), and third way of lifting the scriber is by a mechanical commutator disc (two types of lugs), and a fourth way of raising the scriber is by means of a mechanical commutator disc (one type of lug). The above structure, we prefer to call the signaling means. As previously mentioned, each of the signaling means is provided with one or more means for actually imparting the motion to the scriber, and these means we prefer to call pick-up signals. Two means of carrying out the first signaling means (holes in the record band) comprise (1) bent contact arms dropping in holes on the record band and acting on micro-switches; (2) plunger type of contact brush which will complete a circuit when dropping into hole in the record band and contacting the wheel. The pick-up signaling means for the electrical commutator disc (two type lugs) is a latching push arm. The pick-up signaling means for the mechanical commutator disc (one type lug) is by pin and 6-faced cam.

The actual mechanical means of raising the scriber in the first and second signaling means, i. e., holes in the record band and electrical commutator disc, may be carried out by means of a T arm, or by means of a half round rod. The third and fourth means of signaling, i. e., mechanical commutator disc (two type lug) or mechanical commutator disc (one type lug) are carried out through the T arm only.

Figure 9:
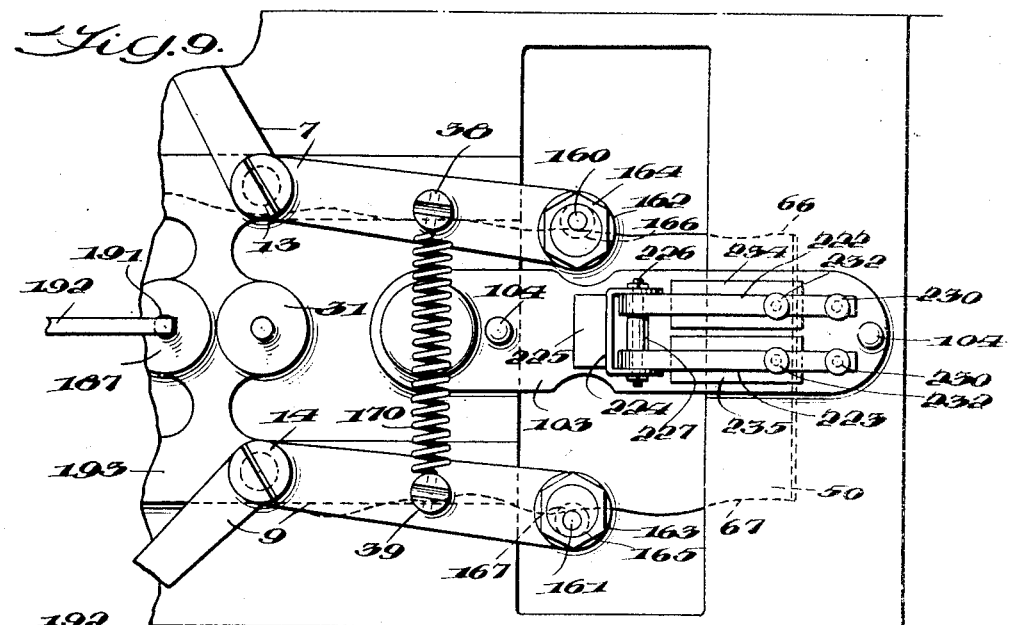
Figure 9 is an enlarged detailed plan view of Figure 8, with parts broken away.

Referring now to the first signaling means for raising the scriber, and each of its various methods of pick-up signaling means and the mechanical raising of the scriber, reference is made to Figure 8. As aforementioned, there are two different ways in which the record band is marked to indicate the lifting of the scriber, or the duration of time which the scriber was raised from the writing plate 20. The first of these means consisted of the solenoid 31, yoke member 33 acting upon rocker arms 37 and 36, so as to enable the coil springs 43 and 44 to raise the marking pens 16 and 17 when the scriber 2 was raised from the writing plate. Assuming that this structure was used to record the vertical movement of the pen, the marking lines 51 and 52 will be interrupted every time the scriber has been lifted from the writing plate. As the band has calibrations thereon, it is a simple matter to cut holes 220 and 221 in the band, hole 220 being in position at the start of the break in marking lines 51 and 52, while hole 221 being in position opposite the end of the break in the lines 51 and 52. Assuming, however, that the other method as shown in Figures 14 and 16 was used to mark the band upon the lifting of the scriber, then the marking pen 102 would mark a straight line on the record band, which line would continue for the duration for the time that the scriber was lifted from the writing plate 20. The same manner of positioning the holes 220 and 221 would be applied, as previously mentioned, with the break in the lines 51 and 52. The two means of picking up this signal comprised either the bent contact arms as shown in Figures 9 and 10, or the plunger type brush contact which is shown in Figures 13 and 15. Referring first to the bent contact arms as shown in Figures 9 and 10, it will be seen that the arms 222 and 223 are bent so as to be substantially U shaped, these arms being supported by a yoke member 224, the latter being supported by a horizontal leg 225 which is attached to the plate 103 in any suitable manner. A pivot pin 226 pivotally supports the arms 222 and 223 in the yoke member 224. A spacing collar or sleeve 227 is mounted on pin 226, as will be seen readily in Figure 9. The end of arms 222 and 223 have a sliding contact member 228, which member is adapted to contact the metal portion of the sprocket wheel 70 when the holes in the tape are in registry therewith. A tension spring 229 is secured to the plate 103 in any manner, and the upper portion thereof is secured to a thumb screw 230. A locking nut 231 is mounted on the thumb screw 230 for adjusting the position of arms 222 and 223. Similar thumb screws 232 are positioned through apertures in the end of arms 222 and 223, and have their lower ends secured to the micro-switches 234 and 235. These thumb screws are also provided with locking nuts 233. Referring now to Figures 8, 9 and 10, it will be seen that when the hole 220 reaches the contact point 228 of arm 222, the arm, through the tension spring 229, will drop into the hole 220, thus making contact with micro-switch 234. This switch operates a locking relay which will energize solenoid 187. As will be seen in Figures 1 and 7, the energizing of solenoid 187 will permit the plunger 191 to drop, thus permitting the rocker arm 192 to drop. This rocker arm 192 is mounted on the substantially U shaped member 193 by means of a fulcrum yoke 194 and a pivot pin 195. A lifting rod 196 is rigidly secured to the end of the rocker bar 192. As the solenoid 187 is energized the plunger 191 will drop, thus permitting the rocker arm 192 to be rocked about its pivot pin 195 through the tension of tension spring 199, thus raising the lifting rod 196. As this lifting rod is mounted beneath link arms 4 and 6, the arms will be raised upwardly through the universal joint connections 5 and 8, thus raising the scriber 2 from the writing plate. When the hole 221 is in registry with the sliding contact 228 mounted on arm 223, the arm 223 will rock about its pivotal connection 226 through the tension of spring 229, thus operating the micro-switch 235 through the thumb screw 232. This circuit will then go through a similar locking relay as previously described with micro-switch 234, and will energize the solenoid 187 so as to force the plunger rod 191 upwardly, thus rocking the rocker arm 192 about its pivotal connection 195 against the action of tension spring 199, thus permitting the lifting rod 196 to drop. As the lifting arm 196 drops, the link arms 4 and 6 will drop, thus permitting the scriber to again contact the writing plate.

Figure 2:
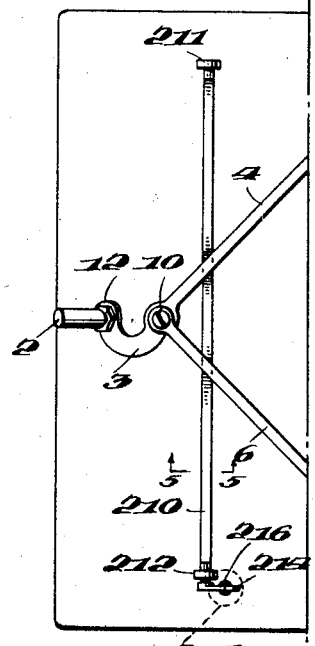
Figure 2 is an enlarged detailed plan view showing a modified form of raising the reproducing scriber during reproduction of writings.
Figure 3:
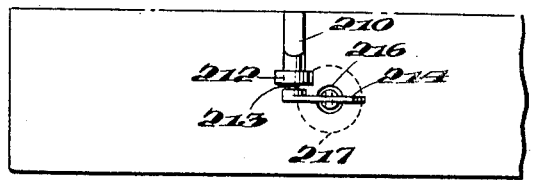
Figure 3 is an enlarged detailed plan view of a portion of the modified form of raising the reproducing scriber during reproduction of writings as shown in Figure 2.

Another mechanical way of raising the pen, following the same signaling means and signal pick-up means as previously described is shown in Figures 2, 3, 4 and 5. The operation of the rocker arms 222 and 223 will be exactly the same as previously described, except that the micro-switches 234 and 235 will operate through the same locking relays, but they in turn will be connected to solenoid 217. As the relay is locked in one direction caused by the micro-switch 234, the solenoid 217 would be energized to raise the plunger 216. This plunger 216 is connected to the bifurcated member 214 and the bifurcated member 214 is keyed or otherwise fixedly secured to a reduced end portion 213 of a rocker arm 210 (see particularly Figure 5). This rocker arm 210 is supported in bearings 211 and 212. Thus, upon the raising of the plunger 216, the bifurcated member 214 is raised, thus rotating the rocker arm 210 from its flat position as shown in Figures 2 and 5, so that the rounded portion of the cam contacts the link arms 4 and 6, thus raising the same about their universal joints 5 and 8, and as these arms are raised, the scriber 2 will be lifted from the writing plate 20. When the sliding contact 228 mounted on rocker arm 223 drops into hole 221, micro-switch 235 will operate a locking relay to de-energize the solenoid 217, thus permitting the plunger 216 to drop. As the plunger 216 drops, the bifurcated member 214 will be pulled downwardly, thus rotating the rocker cam 210 so that the same will assume its normal position with its flat side up as shown in Figures 2 and 5, thus permitting the link arms 4 and 6 to drop. Upon the dropping of the link arms 4 and 6, the scriber 2 is again resting upon the writing plate 20.

Still utilizing the holes in the tape as shown in Figure 8, for the signaling means, we may substitute the plunger type of brush contact as shown in Figures 13 and 15, and the rocker arms 222 and 223. This mechanism may be mounted on the top of frame 1 and assume the same position as the marking means as shown in Figure 16, as the marking means is in operation only during the recording of a signature. After the signature has been recorded this device as shown in Figure 16 may be removed, and the plunger brush as shown in Figure 15 may be mounted on the top of the cabinet. The only manual operation for the substitution for the mechanism shown in Figure 15 and for that shown in Figure 16 is to remove the solenoid 100, plunger 101 and marking pen 102, and insert the brush holders 240 and 241 on the plate 103. These brush holders carry brushes 242 which are urged downwardly by the springs mounted in holders 240 and 241. The operation of this signal pick-up means is somewhat as follows: As the hole 220 comes into registry with the brush 242 mounted in holder 240, the same will drop so as to complete a circuit through the metal wheel 270, thus energizing a locking relay which may be connected to either solenoids 187 or 217, in accordance with the particular mechanical means utilized for the raising of the pen, all of which operation has been previously described. As the hole 221 comes in registry with the brush 242 mounted in the holder 241, a second locking relay is energized thus operating either solenoid 187 or 217 (in accordance with the means utilized for raising the scriber) to permit the scriber to again contact the writing plate.

Figure 4:
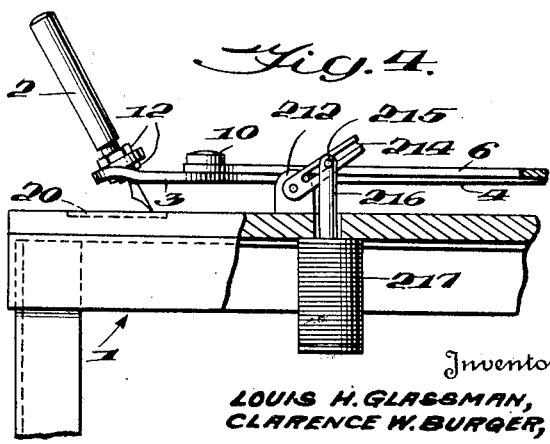
Figure 4 is an enlarged side elevation of a portion of the modified form of raising the reproducing scriber during reproduction of writings as shown in Figure 2 with parts broken away.

Referring now to the second signaling means previously mentioned, i. e., the electrical commutator disc, we refer to Figure 7. It will be noted that the upper portion of Figure 7 shows the mechanism for recording the signal, and it must be assumed that during the reproduction thereof, the following wheels 166 and 167 as shown in Figure 8 will be substituted for the marking pens 16 and 17. Also, the rocking arms 37 and 38, as well as the yoke member 33, coil springs 43 and 44 will all be removed, and the tension spring 170 will be substituted therefor, as shown in Figure 8. Referring particularly now to Figure 7, a signaling wheel 180 having calibrations 181 thereon is fixed to the shaft 54. When the marking lines 51 and 52 are broken, which is caused by the raising of the scriber or where an auxiliary line is formed by the marking pen 102 as shown in Figure 16, either of which signaling means forms an indication on the record band as to the raising and lowering of the pen. This indication is noted on the record band by means of calibrations thereon, and signal lugs or cams 182 and 183 are positioned on the periphery of the wheel 180, corresponding to the calibrations noted on the record band. The cam 182 would be positioned at the start of the break in lines 51 and 52, or at the start of the auxiliary line formed by the marking pen 102. The cam 183 would be positioned on the wheel 180 at the same position as the end of the break in lines 51 and 52, or at the end of the auxiliary line formed by the marking pen 102. In other words, one lug would be positioned at the start of the raising of the scriber, while the second lug would be positioned when the scriber is to be lowered upon the writing plate. As the wheel 180 is fixed to the shaft 54, the wheel will revolve one complete revolution at the same time the record band wheel 53 revolves one complete revolution. Thus, it will be seen that upon the rotation of wheel 180, lug 182 will force the leaf switch 185 to break the circuit to the locking relay which in turn would be connected with solenoid 187, thus de-energizing the solenoid permitting the plunger 191 to drop thus rocking arm 192 about its pivot point 195 and raising the rod 196 to raise link arms 4 and 6, all of which will raise the scriber 2 from the writing plate. When the lug 183 contacts the leaf switch 185 the circuit is again made in a locking relay to again energize the solenoid 187, thus forcing the plunger 191 upwardly, and rocking arm 192 about its pivot point 195 against the tension of spring 199, thus allowing the lifting rod 196 to drop, all of which will allow the link arms 4 and 6 to lower the scriber 2 upon the writing plate 20. This same signaling pick-up means as just described, could operate solenoid 217 as shown in Figure 4, to alternately energize and de-energize the same, thus operating the plunger 216 to rock the cam 210, all of which mechanism has been described.

The third signaling means for raising the pen, i. e., the mechanical commutator disc (two type of lugs) is shown in Figures 21, 22 and 23. In this form a signal wheel 250 having calibrations 251 thereon is keyed or otherwise fixedly secured to a shaft 252, which shaft revolves at the same speed as the record band, whether the record band is supported on the wheel 53 as shown in Figures 6 and 7, or whether the record band is supported on the sprocket wheel 70 as shown in Figures 8 and 10. The periphery of the wheel is channel-shaped, as shown in Figures 22 and 23. The lug 254 is positioned on the channel-shaped portion of the periphery of wheel 250 opposite the same calibrations which were noted upon the record band upon the lifting of the scriber. Lug 253 is likewise positioned on the wheel 250 opposite the calibrations corresponding to those on the record band wherein the scriber was again lowered on the writing plate 20. Operation of this modification is as follows: Upon the rotation of the wheel 250, the lug 254 will strike the lower portion of the pivotal ledge 261, thus disengaging the lower portion of rocker arm 260. The tension of spring 270 will urge the lower portion of rocker arm 260 downwardly so as to ride on the channeled portion of the periphery of wheel 250. As the rod assumes this position, the same is rocked about the pivotal connection 195, thus raising the scriber by means of a suitable lifting arm (not shown), the same being of similar construction as either lifting rods 196 as shown in Figure 1 or 303 as shown in Figure 26. The rocker arm 260 will remain in this position riding in the channel-shaped portion of the periphery of the wheel 250, thus retaining the scriber in its lifted position until lug 253 meets the lower portion of the rocker arm 260, at which time the lug 253 will force the rocker arm 260 upwardly against the tension of spring 270. At this time the pivotal latching member 262 will engage the protuberance 261 formed on the rocker arm 260. Thus the rocker arm 260 is again rocked about its pivotal connection 195, thus lowering the lifting rod (not shown), thus lowering the scriber upon the writing plate 20.

The fourth signaling means for raising the pen, i. e., the mechanical commutator disc (one type of lug) is shown in Figures 17 and 18. The signal wheel 280 having calibrations 281 thereon is fixed to shaft 282. The wheel 280 rotates at the same speed as the record band, whether the record band takes the form of the band 50 mounted on the wheel 53, or the band 76 mounted on the sprocket wheel 70. The wheel 280 is grooved as shown in Figure 19, so that lugs 283 may be secured to the periphery of the wheel by means of thumb screws 284. These lugs are positioned on the wheel corresponding to the calibrations noted upon the record band, the setting thereof being the same as that described in the previous means for raising the scriber. A pinion gear 285 is secured to a supporting shaft 287 by means of a collar 286. The shaft 287 is supported by the bracket 288, the bracket being secured to the framework 1 in any suitable manner. A cam 290 is also secured to the shaft 287 by means of a collar 291. A disc 292 is also secured to the shaft 287 by means of a collar 292$^1$. This disc 292 has six equally spaced round detents in one face thereof, in which a pin 293, forced inwardly by leaf spring 294, is adapted to seat. Assuming now that the lugs 289 and 283$^1$ are positioned opposite the calibrations on the wheel 280, corresponding to those noted on the record band, at the start and completion of the raising of the scriber, the lug 283 will hit one of the teeth on the pinion gear 285, thus rotating the shaft 287 ⅙ of one revolution. Rotation of the shaft 287 will rotate the cam 290 so that the same will take the position as shown in full lines in Figure 18, thus raising the rod 295, rod 295 in turn raising the scriber 2 by means of a cross rod mounted underneath the arms 4 and 6 (not shown). When the shaft 287 is thus rotated ⅙ of a revolution, the disc 292, fixed to shaft 287, also rotates ⅙ of a revolution. The pin 293 will be forced into one of the detents on the disc 292 by means of leaf spring 294, so as to hold the disc in position, thus preventing shaft 287 from further rotation, so that cam 290 will not override its intended position. It will be understood that the detents on disc 292 are not so deep that the pin 293 will prevent rotation of the disc 292 when the shaft 287 is positively actuated. The cam 290 will remain in the position shown in full lines to keep the rod 295 and scriber 2 in elevated position until cam 283$^1$ contacts one of the sprockets on sprocket wheel 285, thus again rotating the sprocket wheel ⅙ of one revolution, thus rotating shaft 287 ⅙ of one revolution. As the shaft rotates ⅙ of one revolution, the cam 290 will take the position as shown in dotted lines in Figure 18, thus permitting rod 295 to drop, which in turn will permit the scriber to again be lowered to the writing plate 20. Again, the disc 292, by means of the detents therein, the pin 293, etc., will prevent the cam from overrunning its intended position.

Referring again to the electrical diagram (Figure 40), it will be understood that the same will show any of the electrical means of raising and lowering the scriber, and reference hereinafter is confined only to such electrical methods. In any of these methods there are two actuating devices, either leaf spring switches or microswitches, which receive and execute an impulse to raise or lower the reproducing scriber.

When solenoid, marked "T," is energized the reproducing scriber writes. When it is de-energized the reproducing scriber lifts. The operator throws selector switch D to post marked "run" completing the circuit R, L, S₂, S₁ to power, thus energizing solenoid T. When the actuating mechanism momentarily closes switch H (normally open), the circuit R is completed through switch H, wire P, switch J (normally closed), M₁, relay coil Y, S₁, to power. This circuit energizes coil Y, breaking the contacts at the relay marked L, which breaks the circuit in S₂, thus de-energizing the solenoid T, allowing the scriber to raise. The telephone type relay is electrically locked into energization since the circuit in Y, although momentarily completed by the closing of switch H, is maintained through the circuit P, M₂, and switch J. Thus, the solenoid T is held de-energized until switch J is momentarily open, breaking the circuit in P, M₂, allowing the relay to spring open and again complete a circuit through L, S₂, again actuating solenoid T, and lowering the reproducing scriber 2.

In order to hold the paper upon which the reproduction of the signature is to be made, we have provided a spring clamp 300 (see Figures 26, 27, 28 and 29) which is fixed to the plate 193 in any known manner, the clamp having a serrated rubber pad 301 being generally rectangular in shape. This spring clamp is formed so as to force the rubber pad 301 downwardly into contact with the writing plate under normal conditions. The clamp 300 is connected to the rocker arm 302, which arm may take the form of the rocker arms 192, 206 or 295 (previously referred to for raising the scriber) having a scriber lifting rod 303 operated by a solenoid 304, the solenoid having a plunger 305 working therein. The plunger 305 is connected to the rocker arm 302 through link arm 306. The rocker arm 302 is supported in a fulcrum 194 about a pivot point 195. The means of connection between the rocker arm 302 and the spring clamp 310 comprises a take up stud or lost motion pin 308 having heads 309 and 310 mounted on either end thereof. This stud 308 is inserted through apertures formed in rocker arm 302 and spring clamp 300. The operation of this paper clamp, see Figure 10, is as follows: The gear 131 having a pin 132 mounted thereon is rotated by sprocket gear 130 which is fixed to the shaft 71, the shaft 71 supporting the sprocket wheel 70. The gear ratio between gears 130 and 131 is such that the gear 131 will make one complete revolution when the record band (in the form of band 76) makes one complete revolution. Upon one complete revolution of the band 76, the gear 131 will make one complete revolution, and the pin 132 will contact the leaf switch 133, the switch 133 making the circuit to a locking relay which in turn will energize the solenoid 304 (see Figure 26). At this point, it should be explained that solenoid 304 has two stages of motion, either by a greater impulse therein or by two separate windings having a single plunger. In either event, the solenoid 304 may be operated to impart a stroke to the plunger 305 so as to rock the arm 302 about its pivotal connection 195 to thus raise the rod 303 which in turn will lift the link arms 4 and 6 thus raising the scriber from the writing plate. This operation of the solenoid 304 may be by any of the previously mentioned means for raising the scriber. However, when operating the paper clamp the leaf switch 133 will either impart a greater impulse to solenoid 304 to give the plunger 305 a greater stroke, or will operate a separating winding in the solenoid to give the plunger 305 a greater stroke. It will be obvious that every time the paper clamp is to be raised to enable paper to either be fed or ejected from the writing plate the scriber must also be raised. Therefore, when the leaf switch 133 operates the greater stroke of the plunger 305, the rocker arm 302 will be rocked to a greater extent than that necessary to lift the pen, and this greater movement of the rocker arm will take up the lost space between the spring clamp 300 and the lower head 310 of the stud 308, thus raising the scriber and spring clamp 300 simultaneously, as shown in Figure 29. As the pin 132 mounted on the gear 131 passes the leaf spring 133, the circuit is again broken, thus permitting the rocker arm 302 to drop to either the position shown in Figure 28 or Figure 26, through the action of the solenoid 304.

Another means of operating the solenoid 304 for raising the paper clamp 300 is shown in Figure 7. In this form, a cam 122 is fixed on shaft 54 and rotates therewith. This cam 122 will make one complete revolution with a complete revolution of the record band, in this instance the band 50 mounted on wheel 53. As the cam contacts the arm 120 which is pivotally connected to the frame 121, the arm will be forced downwardly thus operating the switch 124, the switch in turn completing the circuit to solenoid 304.

Still another means is provided for operating the paper clamp, this being shown in Figure 21. In this form the rocker arm 260 will be substituted for the rocker arm 302 as described above. The rocker arm 260 has the take-up stud 308 mounted therethrough, the stud also being mounted through an aperture formed in the spring clamp 300. It will be recalled that the vertical movement of the lower portion of arm 260 caused by lugs 253 will raise the scriber. These lugs 253 impart only a short stroke to the rod 260, thus enabling the scriber to be raised by means of the rocker arm and lifting rod (not shown). However, if the arm is permitted to drop an appreciable amount, the lost motion space between the spring clamp 300 and lower head 310 of the stud 308 will be taken up, and the clamp 300 lifted in the same manner as that previously described in Figures 26 through 29. This longer stroke is imparted to the rod 260 by means of an inside cam 325. The lower portion of rocker arm 260 rides in the channel portion of the periphery of the wheel 250, and is raised into the latched portion as shown in the Figure 21 by means of the lug 253. When the same is raised and held in its raised position by means of the latch 262 the scriber is lowered to the writing plate. However, when lug 254 comes into contact with the extension 267 of the latching member 262, the latching member 262 is moved against the tension of latch spring 266 to pivot about the pivotal connection 264 thus unsetting the latch and allowing the rod 260 to be pulled downwardly by action of tension spring 270. When the rod 260 is riding in the channel of the periphery of the wheel 250, a short stroke is imparted which will raise the scriber. As soon as the rod 260 comes into registry with the inside cam 325, the rod is forced downwardly a considerable distance by action of the tension spring 270, thus giving a long stroke to the rocker arm 260 which will be sufficient to take up the lost motion provided between the spring clamp 300 and head 310 of the stud 308, and lift the spring clamp 300. This movement is more or less momentary, the same being only for a sufficient length of time to enable the paper ejector (which will presently be described) to remove the paper upon which a signature has been written, and to manually feed a second sheet of paper.

Still another means for operating the paper clamp is shown in Figure 20, wherein a lever 315 is pivotally supported to a bracket 316 about a pivotal connection 317, and is provided with a rolling contact member 318. Cam 319 is mounted on the band the same being positioned thereon at the start of the reproduction of a signature, and extends to the start of a second signature, which we generally refer to as the return distance of the record band, wherein the scriber is returned from the end of one signature to the beginning of a second signature. A lug or seat 320 is formed on the rocker arm 295, the end of arm 315 adapted to seat thereon. As the record band 50 revolves, the rolling contact member 318 will ride up on cam 319 to thus rock the lever 315 about its pivotal connection 317, thus forcing the rocker arm 295 downwardly to take the position shown in full lines in Figure 20. This will impart a sufficient stroke to the rocker arm 295 so as to operate in a similar manner as the rocker arms 260 or 302 as previously described.

In order to remove the paper after the signature has been written thereon, when the paper is fed manually to the writing plate, we utilize the structure shown in Figures 24 and 25. In these figures, a small electric motor 330 is mounted on plate 193 in any suitable manner, and rotates a drive shaft 331, upon which a pulley 332 is mounted. An endless driving belt 333 is mounted about the pulley 332 and is positioned about direction pulleys 334 which are mounted on the rocker arm 340. The driving belt 333 drives the pulley 335 which in turn drives the shaft 336. A rubber cylinder 337 is fixed to shaft 336, and rotates therewith. The shaft 336 is supported by means of brackets 338 and 339, which are also connected to the rocker arm 340. The rocker arm 340 is supported by yoke 341, being pivotally connected thereto by pivot pin 342. The yoke 341 is mounted on the plate 343 in a suitable manner. The electric motor 330 is constantly energized so that the driving shaft 331 and pulley 332, through driving belt 333 and driven pulley 335 and driven shaft 336 will constantly revolve the rubber cylinder 337. The solenoid 346 may be operated in any one of the same ways in which the solenoid 304, as shown in Figure 26, is operated. Upon the operation of the solenoid 304 to raise the paper clamp 300, the solenoid 346 will be momentarily energized when the plunger 305 of solenoid 304 is given its greatest stroke, to raise the plunger 345 which is connected to the rocker arm 340 through the pin 343. Thus, upon the raising of the spring clamp 300 the solenoid 346 will cause the rocker arm 340 to rock about its pivotal connection 342 to lower the revolving rubber cylinder 337 into contact with the paper. Thus, the paper will be forced out from under the paper clamp 301 and the writing plate 20. In view of the fact that solenoid 346 will only be momentarily energized at the raising of the paper clamp, this will give sufficient time for the rubber cylinder 337 to eject the paper and again be raised so that paper may be manually fed under the paper clamp 301, while the paper clamp is still in its raised position. In other words, the paper ejector is actuated only for the moment during the start of the raising of the paper clamp, after which the same is raised to inoperative position.

We have also shown a means for feeding paper upon which the signature is to be written, which means will automatically feed sheets of paper to a position underneath the reproducing scriber 2, which means is operable to feed the paper during the return distance of the pen upon the completion of one signature and before the start of the second signature. Also, the mechanism will remove the piece of paper upon which the signature has been written, while at the time of such removal, a second piece of paper will be positioned under the reproducing scriber, and so on. Further, the feed means is capable of adjustment so that the writing may be positioned at any selected location on the paper, in order that the writing or signature may appear at the proper place on letters of varying length, checks, or the like. This mechanism is shown in Figures 32 through 39. Referring now particularly to Figure 36, a disc 350 (shown in detail in Figure 33) is loosely mounted about shaft 54 and at the same time being rigidly connected by any suitable manner to a portion of the frame 1. This disc 350 carries a wedge shaped cam 352, which cam occupies a distance of $\frac{1}{10}$ of the circumference of the disc 350. A wheel 354 is fixed to the shaft 54 through the medium of set screw 356. The wheel 354 has a pin 357 mounted therethrough, said pin being forced outwardly by means of the compression spring 358. This pin is adapted to ride about the face of the stationary disc 350, upon rotation of the shaft 54 and wheel 354.

As the shaft 54 is the driving shaft for the record band, the wheel 354 will make one complete revolution during the same time that the record band makes a complete revolution. However, as previously described, approximately $\frac{1}{10}$ of the band is utilized to provide for the return of the scriber on the completion of a signature, so that the scriber will be in position for the start of a second signature. During $\frac{1}{10}$ of the revolution of the record band, while the scriber is reproducing the signature, the pin 357 will be riding freely about the stationary disc 350. However, at the completion of a signature and at the start of the return motion of the scriber the pin 357 will start to ride upon the wedge-shaped cam 352. At this time, the pin 357 is forced inwardly against the tension of spring 358, so as to project into one of the apertures 362 in the hub 361 of sprocket wheel 360. This sprocket wheel 360 is supported by shaft 54, although the same is freely mounted thereon. A suitable guide collar 363 is fixed to the shaft 54 by means of set screw 364, said guide collar 363 merely acting as a stop for the wheel 360. As the pen 357 projects into one of the apertures 362, the sprocket wheel 360, through the medium of its hub 361, will be rotated along with the wheel 354. This rotation of sprocket wheel 360 will continue as long as the pin 357 is inserted into the aperture 362, which will also continue until the pin 357 rides off to the wedge cam 352, at which time the spring 358 will force the pin outwardly so as to release the connection between wheel 360 and wheel 354.

The sprocket wheel 360 drives the chain 365, and the chain in turn drives a small sprocket wheel which is fixed to shaft 370. The gear ratio between the large sprocket wheel 360 and the small sprocket wheel which is mounted on shaft 370 is 10 to 1, so that upon $\frac{1}{10}$ of a revolution of the sprocket wheel 360 the shaft 370 makes one complete revolution. This shaft 370 is journaled in a support 371. A gear 372 is fixed to the shaft 370 by means of a collar 373, so that the gear 372 will rotate with the shaft 370. The gear 372 meshes with gear 374, the later gear being fixed to hollow shaft 380. The hollow shaft 380 is supported in any suitable manner to the frame 1. Pinion gear 388 is fixed to the hollow shaft 380. Pinion gear 388 meshes with a worm gear (not shown), the worm gear being rotatively mounted in brackets 390, the bracket in turn being fixed to disc 392. The disc 392 is fixed to the shaft 375 by means of the collar 389. Thus, upon the rotation of sprocket gear 360, the driving chain 365 will rotate the small sprocket wheel mounted on shaft 370, thus rotating shaft 370, which in turn rotates the gear 372. Upon the rotation of gear 372, gear 374 will be rotated, which in turn will rotate the hollow shaft 380. Upon the rotation of the hollow shaft 380, the pinion gear 388 will be rotated and upon its rotation the worm gear having the bracket 390 and disc 392 connected thereto will rotate with the pinion gear 388. As the disc 392 is fixed to the shaft 375, the rotation of disc 392 will in turn rotate shaft 375. The pinion gear 388, worm gear (not shown) which is fixed to the bracket, and disc 392 is a means of making adjustment of the start of the rotation of shaft 375, the purpose of which will hereinafter be explained.

A cam 382, which we shall hereinafter refer to as the detent cam, is fixed to shaft 375 by means of the bushing 383. A cam 385, which we shall hereinafter call the paper feed cam, is also fixed to shaft 375 by means of the bushing 386. A drum 395 is fixed to shaft 375 by means of collars 396 and the set screws 397. A cam 398, which we shall hereinafter refer to as the finger cam, is mounted about the shaft 375, but is free from rotation. This finger cam 398 is rigidly secured in any suitable manner to the bracket 399, the bracket in turn being secured to the frame 1.

Referring now to Figures 36 and 39, a rotatable follower 453 is adapted to ride about the detent cam 382. This follower is supported by arm 452, the arm in turn being pivotally secured about the pivotal connection 451 to the hanger block 376. The arm 452 is forced upwardly so that the follower 453 is in constant engagement with the cam 382 by means of spring 455. The arm 452 has an extension 450, which extension carries the detent 448. As the cam 382 rotates, the follower 453 will ride thereon, and the raised portion of the cam will force the follower outwardly, which in turn will rock the arm 452 about its pivotal connection 451 so as to assume the position shown in dotted lines in Figure 39. In this latter position, it will be noted that the detent 448 has been raised.

Upon the rotation of the shaft 375, the cam 385 will rotate so as to engage a rotatable follower 414, which follower is mounted on the rod 412, the upper portion of the rod 412 being pivotally connected to an extension 410 of bracket 376 by means of pivotal connection 413. The lower end of rod 412 is pivotally connected to rod 415 by a pivotal connection 416. A rod 418 is pivotally connected to rod 415 by pivotal connection 419. This rod 418 is mounted in a rectangular track 420, the track being rigidly secured to the rod 418 and the stationary track 420, so as to constantly urge the rotatable follower 414 into engagement at all times with the paper cam 385. A rod 435, see Figure 32, is rotatably supported in rod 418. A rod 436 is rigidly secured to rod 435, and carries a roller 437 at its open end. The rod 435 carries a rod 438, the two being rigidly fixed to each other, the rod 438 in turn supporting a shoe 440, by means of pivotal connection 441. The shoe 440 has a rubber facing on its underside thereof, so as to frictionally engage sheets of paper. Upon the rotation of the paper cam 385, the follower 414 will be forced outwardly at the raised portion of the cam, thus rocking the arm 412 about its pivotal connection 413, which in turn will move rods 415 and 418 against the tension of spring 421. As rod 418 is moved inwardly towards the drum, rod 435 carrying rods 436 and 438 therewith will also be moved inwardly. As the pad 440 is connected to rod 438, the pad 440 will move towards the drum 395.

Upon the forward motion of the rod 435, the roller 437 which is mounted on rod 436 (see particularly Figures 34 and 35) on the track 432, which track is welded or otherwise connected to vertical plate 430, the vertical plate in turn being connected to link 422. As rod 435 moves forwardly, the roller 437 will drop into the track 432 thus permitting the rod 435 to rotate slightly about its connection with rod 418, thus permitting the shoe 440 to drop into engagement with the upper most piece of paper. As the rod 435 moves to its furthermost position, the roller 437 will rise on the inclined portion of track 432 thus rotating the rod 435 in the opposite direction, thus lifting the shoe 440 upwardly out of contact with the paper. As the roller 437 rides up the incline of track 432 the same forces a leaf spring 433 upwardly as shown in dotted lines in Figure 35. The roller 437 will move forwardly beyond the leaf spring 433, thus permitting the spring 433 to drop and assume its position shown in full lines in Figure 35. At this point, the raised portion of the cam 385 will have passed, and the follower 414 will drop, thus causing the return of rods 412, 415, 418 by means of the spring 421. As the rod 418 returns, the rod 435 will assume its furthermost position away from the drum 395. As the rod 418 returns, carrying therewith rod 435, the roller 437 will ride on top of the leaf spring 433, thus through the medium of arms 436 and 438, the shoe 440 will be raised out of contact with the paper. After the rod 418 forces the rod 435 at its extreme righthand position as shown in Figure 34, the roller 437 will pass beyond the end of leaf spring 433, and at this point, will drop into the tray 432, thus permitting the rod 435 to rock and thus lowering the shoe 440 into contact with the uppermost piece of paper.

We have provided means for the adjustability of the shoe 440, so that the same will always maintain contact with the uppermost sheet of paper of the stack when feeding the paper to the drum, and at the same time being capable of riding free from the paper at its return stroke, regardless as to the height of the stack of paper. This means comprises a link 422 which is pivotally connected to link 424 by means of pivotal connection 423. Link 424 is pivotally connected to a vertical post 426 by means of a pivotal connection 425. Link 422 is also pivotally connected to link 428 by means of pivotal connection 427, and link 428 is also pivotally connected to the vertical post 426 by means of pivotal connection 429. The vertical plate 430, as previously mentioned, is rigidly connected to link 422, and is supported thereby. This vertical plate is the medium of support for the track 432 and leaf spring 433. A leg 431 which is adapted to be supported on the uppermost sheet of paper is connected to the vertical plate 430. Thus it will be seen that the vertical plate 430 which supports the track 432 and the leaf spring 433 is supported by means of the link 422 and the leg 431. As the height of the stack of paper decreases, the leg 431 will drop downwardly by force of gravity, and the link 422 being one side of a parallelogram will also drop downwardly, but always move in its vertical position. Thus, as the two supports for the vertical plate 430 are capable of moving downwardly upon the decrease in the height of the paper, the track 432 which is the means of raising and lowering the pad 440 through rods 435, 436, roller 437 and rod 438, the shoe 440 will always maintain a definite position relative to the stack of paper upon its feed stroke, and yet will always be raised from the paper upon its return stroke.

Referring now to the means of gripping the paper so as to hold the same to the drum (see Figures 34 and 36), a rod 400 is mounted through the drum, and carries fingers 401 therewith, said fingers being fixed to said rod, the fingers in turn carrying pads 402. Rod 404 is also fixed to rod 400, rod 404 having a rotatable follower 405 mounted at the upper end thereof. Tension spring 406 is adapted to keep the arm 404 and follower 405 in riding engagement at all times upon the finger cam 398. The rod 400, fingers 401, rod 404 and follower 405 all rotate with the drum 395, so that the follower will ride about the stationary finger cam on the drum 398. As the drum rotates, the follower 405 will be in engagement with the stationary finger cam 398, and as the follower rides upwardly on the raised portion of the cam 398, the rod 404 will be forced downwardly as shown in dotted lines in Figure 34. As this rod 404 is forced downwardly, rod 400 is rotated thereby, thus opening the fingers 401 so as to leave a space between the fingers and the periphery of the drum 395. The fingers will remain open while the follower rides on the raised portion of the cam 398, but as the follower drops from the raised portion of the cam to the lower portion thereof, the arm 404 will assume its position as shown in full lines in Figure 34, thus again rotating the rod 400 which in turn will close and clamp the fingers 401 to the periphery of the drum 395.

It will be noted that when the detent 448 is in its upward position, the same is adjacent to the periphery of the drum 395, and as the drum 395 rotates carrying therewith the finger 401, we have provided slots 480 and 481 in the detent 448 so that the fingers 441 may ride therethrough, without disturbing the position of the detent.

Referring specifically to Figure 38, papers to be signed are placed in the lower tray 422, face downward and bottom edge forward. Each sheet of paper will be carried around on the periphery of the drum 395, the drum stopping at a predetermined point, thus holding the paper fixed to its periphery at the point where the scriber 2 writes. As will be shown hereinafter, the spot on the paper which is to be signed can be set before the beginning of operation. After the drum has stopped, the last $\tfrac{1}{16}$ of the record band revolution (which is the return distance on the band) has passed the followers hereinbefore described, and the pen commences to write the signature. Upon the completion of the signature, and at the beginning of the last $\tfrac{1}{16}$ of the record band distance, sprocket wheel 360, the chain 365, the gears 372 and 374, moving through various rotated parts, begin to revolve the drum 395 again. It is noted that $\tfrac{1}{16}$ the revolution on the sprocket wheel 360 will cause the drum 395 and its related parts to complete one full revolution, thus, during $\tfrac{1}{16}$ revolution of the record band, which comprises the return distance of the same, the paper feeding and ejecting mechanism will perform a complete cycle; namely, carrying a sheet of paper from the tray 442 around with the periphery of the drum, stopping at a given time and ejecting the same into the upper tray 470 after signing.

The functions of the various parts of this mechanism are described as follows:

At the beginning of a revolution of the drum 395 detent cam 382 urges the detent 448 upwardly into the position shown by dotted lines, Figure 39. It will be seen in Figure 39 that immediately after the raised portion of detent cam 382 urges the detent upwardly, the raised portion of paper cam 385 following closely behind cam 382 urges the rods 412, 415, 418, and 435 to the right in Figure 39 against the tension of spring 421. This motion through the medium of the pad 440 urges the top sheet of paper towards the drum, the leading edge of which is guided by guides 445 and 446 until this edge strikes the detent 448 in its raised position. This results in the buckling of the sheet of paper. Now if the fingers 401 with their pads 402, pass the portion where the detent is operating, and in passing they are opened away from the periphery of the drum, they will be ready to receive the leading edge of the paper at such times as the detent 448 drops and the buckled paper flicks forward due to the removal of restraint offered by detent 448. Immediately when the paper flicks forwardly, the fingers 401 with the pads 402 close upon the surface of the drum through the medium of the tension spring 406, thus grasping the edge of the paper and carrying the same around until the paper is in a position at the top of drum 395, at a point where the paper is to be signed.

Referring specifically to Figure 34, it will be noted follower 405 will ride on to the raised portion of the stationary cam 398 when the drum has rotated to a point where the fingers 401 has passed friction roller 460. At this time, when the fingers 401 open, the paper is being pressed against the periphery of the drum by means of the rolls 460 and 463 which are rotatably mounted on brackets 461 and 464, these brackets in turn urging the rolls against the periphery of the drum by means of coil springs (not shown). A sheet of paper thus held against the drum will move as long as the drum is rotating, but will stop at a pre-determined time allowing the signature to be written. The leading edge of the paper, being freed from contact with the drum by release of the fingers 401 will be removed from the surface of the drum by the doctor blade and guide 465. Further motion of the drum urges the paper forwardly over this guide and into tray 470. The doctor blade 465 is secured to the frame generally referred to as 1 by means of suitable rigid connection through the medium of bracket 466.

It is particularly noted here that these operations described depend largely upon the timed relationship of the various cams and followers. The position on the sheet of paper where the signature is to be recorded depends upon the length of the paper which is drawn over the drum 395 at the time when the drum stops rotating. Thus, if the drum stops its rotation just as the fingers 401 have passed the detent 448, and therefore receives the leading edge of the paper the moment it begins its revolution, the leading edge of the paper will be carried with the drum and, after release of the finger pressure, will be urged outwardly on the guide 465 and into the tray 470 while the drum, and therefore the finger, returns to its original starting point at the end of the cycle. Thus, it will be seen that the following edge of the paper at the moment of starting is close to the uppermost part of the periphery of the drum before the signature is written. As previously described, the following edge of the paper is the top edge of the paper, and therefore, the signature will be written toward the top of the sheet of paper.

This position of stopping the sheet of paper may be varied by means of a worm gear (not shown) and a pinion gear 388 in Figure 36. The end of the worm gear is adapted by a recess 391 to permit the turning of the same within its supporting bracket 390. In turning the worm gear which is meshed into a pinion gear 388, this latter being rigidly fixed to hollow shaft 380 and through various gears hereinbefore described, in such fashion as to prevent rotation of the worm gear 388, the worm gear with its bracket 390 and the fixed disc 392 travel around the fixed position of the pinion gear 388, this in turn causes the shaft 375, with all parts fixed thereto, to revolve. Before commencing operation of feeding paper the shaft 375 is turned in this manner until the fingers 401 which are mounted through shaft 400 onto drum 395 and thence onto shaft 375, take an initial position as desired. Thus it will be seen that the fingers 401 can be placed in any position relative to the paper detent 448 before starting operation. If, for example, the drum 395 is turned to an initial position so that the fingers 401 are near roller 460, upon starting of the revolutionary cycle of the drum the fingers will not be in a position to receive a sheet of paper until the drum has revolved approximately ⅔ of a revolution bringing the fingers 401 around to a point just below the detent 448. As it is passing this detent 448, the cams 382 and 385 operate to raise the detent, buckle a sheet of paper against the same, and drop the detent immediately that the opened finger passes this point. Thereupon, the action of the follower 405 on its cam 398 causes the fingers to close upon the paper and carry the same to a stopping point, which we originally assumed. This will result in a sheet of paper held against the periphery of the drum, its leading edge under the fingers, at a point near roller 460 and its trailing edge still resting in the tray 442. At this first operation there will be no paper at the uppermost portion of the drum to receive a signature. However, at the start of the next revolution of the drums, this first sheet of paper will be carried with the drum, freed from the drum, and urged outwardly on the doctor blade and guide 465 while the finger travels around with the drum past the detent, picking up another piece of paper in passing and stopping again at the original stopping point near roller 460. As the pen now begins to write it is evident that one sheet of paper is held against the surface of the drum by roller 463, its leading edge being in the tray 470, and another sheet of paper is being held by the fingers 401, its leading edge being positioned with the fingers near roller 460. The pen now completes a signature and the driving mechanism, hereinbefore referred to, again starts a revolution of the drum 395, completely ejecting the first sheet of paper, carrying the second sheet of paper into the position previously occupied by the first sheet, and as the fingers passed around the detent 448, a third sheet of paper is picked up and carried around to the position previously occupied by the second sheet of paper. Thus, a continuous operation of feeding successive sheets of paper to a given position for signing and ejecting the same after signing, is obtained. The position for signing can be varied by manipulation of the original starting or stopping position of the drum through the medium of the worm gear and pinion gear 388.

It will be understood that the terms used in the appended claims should be interpreted in their generic sense, as for instance: the term "stylus" is to include any type of an instrument which is capable of performing the functions intended so to be formed.

We claim:

1. Recording apparatus comprising a traveling record band, a movable stylus element, a pair of band-engaging recording elements movable in fixed recording paths at different transverse areas of the band, hinged arm actuating means connecting the stylus element to the first recording element, and complementary hinged arm actuating means connecting the stylus element to the second recording element, and dual laterally spaced mounting means pivotally supporting said complementary hinged arm actuating means.

2. Recording apparatus comprising a traveling record band, a movable stylus element, a pair of band engaging recording elements, a pair of pivotally connected diverging arms movable with the stylus element, a pair of pivotally mounted converging arms hinged to the first arms and having extensions on the opposite sides of their pivotal mounting supporting the respective recording elements for recording movement in different transverse areas of the band.

3. Recording apparatus comprising a traveling record band, a movable stylus element, a pair of recording elements engaging different transverse areas of the band, a pair of arms pivotally mounted for swinging movement supporting the respective recording elements for movement in fixed recording paths transversely of the band, a second pair of interconnected arms carrying the stylus element, and universal joint connections between the respective arms of the first and second pairs providing for transmission of scribing movement of the stylus element through the arms to the respective recording elements but further providing for lifting movement of the stylus element independently of the first pair of arms.

4. Recording apparatus according to claim 3 including an auxiliary recording element having a mounting independent of the first and second pairs of arms for recording on the band periods of interruption in the scribing movement when the stylus element is lifted, and means responsive to lifting of the stylus element for engaging the auxiliary recording element with the band.

5. Recording apparatus for writings comprising a moving record element, a movable stylus element, means for recording scribing movement of the stylus element on the record element, and means controlled by the movement of the record element for signaling the position of movement of the moving record element.

6. Recording apparatus for writings including a traveling band, a movable stylus element, means for recording scribing movement of the stylus element on the band, and means operating in dependency on movement of the record band for indicating the time for starting and the time for completing the scribing movement in order that the recording of the scribing movement will begin at a selected point on the band and be confined to a selected length of the band.

7. Recording apparatus for writings including a traveling band, a movable stylus element, means for recording scribing movement of the stylus element on the band, and means for indicating the correct speed of writing movement of the stylus element for providing completion of the recording of a writing on a selected length of the band, said indicating means comprising a movable indicator element mounted adjacent the stylus element, and means for moving the indicator element at a speed bearing a fixed ratio to the speed of travel of the record band.

8. Recording apparatus for writings according to claim 7 wherein there is a translucent platen over which the stylus element is moved in executing a writing, and the indicator member is located beneath and moves across the platen so that the writing movement of the stylus element may follow the movement of the indicator element across the platen.

9. Recording apparatus for writings including a traveling band, a movable stylus element, means for recording scribing movement of the stylus element on the band, and signal means operating in dependency on the speed of travel of the band for indicating the time for starting and completing scribing movement of the stylus element in order that the recording of the scribing movement will begin at a selected point on the band and be confined to a selected length of band.

10. Reproducing apparatus comprising a traveling record band having dual record tracks, a stylus element, a pair of elements engaging the respective tracks of the record band, and movable in fixed linear paths transversely of the band, a pair of pivotally mounted swinging arms actuated by the respective band-engaging elements, and a second pair of arms pivotally interconnected and carrying the stylus element, the arms of the second pair having universal joint connections with the respective arms of the first pair to provide for lifting movement of the stylus element independent of the first pair of arms.

11. Reproducing apparatus comprising a traveling record band having dual record tracks, a stylus element, a pair of elements engaging the respective tracks of the record band, and movable in fixed linear paths transversely of the band, a pair of pivotally mounted swinging arms actuated by the respective band-engaging elements, a second pair of arms connecting with the stylus element, said second pair of arms having hinge connections providing for lifting movement of the stylus element independent of the first pair of arms, actuating means for lifting the stylus element, and control means for said lifting means.

12. Apparatus for recording and reproducing writing and other line forms comprising a traveling record member, a stylus element, a pair of laterally spaced fixed reference points, dual record member engaging means pivoted about said reference points and movable in fixed paths at different transverse areas of the member to form dual record tracks on the record member during recording and movable under control of the record tracks during reproducing, and complementary dual actuating means interconnecting the stylus element and the respective record member engaging means operable in response to scribing movement of the stylus element in executing a writing to actuate the dual record member engaging means to form dual record tracks on the record member representing the complete writing executed by the stylus member, and said dual actuating means being reversely operable in response to movement of the respective dual record member engaging means by the dual record tracks to actuate the stylus element to reproduce the writing.

13. Apparatus for recording and reproducing writing and other line forms comprising a movable record member, two series of hingedly connected lever arms, laterally spaced stationary pivotal mounting means for each lever arm series, record member-engaging means movable with the respective lever arm series in engagement with transversely spaced areas of the record member, and a stylus element movable with both lever arms.

14. Apparatus for recording and reproducing writing and other line forms comprising a traveling record band, a pair of lever arms pivotally mounted at laterally spaced points, a second pair of lever arms hinged to the first pair, a stylus element, holder means for the stylus element connected to the second pair of arms, and means engageable with the record band to simultaneously form records representing a writing executed by the stylus element at transversely spaced areas thereof.

15. Apparatus for recording free-hand writing comprising means to record the movements incident to free-hand writing on a moving record member, and means for signaling the amount of movement of the record member to the writer during recording, so that the writer may increase or decrease the speed of the free-hand writing to correspond with the speed of the moving member.

16. Apparatus for recording writing comprising means to record the movements incident to writing on a moving record member, movable indicating means movable in dependency on the speed of the record member visible to the writer for indicating the relative position of the record member in relation to progressive portions of the writing, so that the writer may time the speed of the writing to correspond to the speed of the moving record member.

17. Apparatus for recording writing comprising means to record the movements incident to writing on a moving record member, and means visible to the writer at all times for indicating the relative position of the record member in relation to progressive portions of the writing, so that the writer may time the speed of the writing to correspond to the speed of the moving record member, and means to regulate the speed of the moving record member.

18. Apparatus for recording writing comprising means to record on a record member the movements of a stylus incident to writing, automatically actuated means to record the lifting movement of said stylus on said record member, and means visible to the writer at all times for indicating the relative amount of movement of the record member in relation to the writing.

19. Apparatus for recording writing comprising means to record the movements of a stylus incident to writing on a moving record member, automatically actuated means to record the lifting movement of said stylus on said record member, means visible to the writer at all times for indicating the relative amount of movement of the record member in relation to the writing, and means to regulate the speed of the record member.

20. Apparatus for recording writing comprising means to record the movements of a stylus incident to writing on a moving record member, electrically controlled means to record the lifting movement of said stylus on said record member, means for signaling the amount of movement of the record member to the writer so that the writer may increase or decrease the speed of writing to correspond with the speed of the moving record member, and means to regulate the speed of the moving record member.

21. Apparatus for recording and reproducing writing and other line forms comprising a traveling record member, a stylus element, a pair of laterally spaced fixed reference points, dual record member engaging means pivoted about said reference points and movable in fixed paths at different transverse areas of the member to form dual record tracks on the record member during recording and movable under control of the record tracks during reproducing, and complementary dual actuating means interconnecting the stylus element and the respective record member engaging means operable in response to scribing movement of the stylus element in executing a writing to actuate the dual record member engaging means to form dual record tracks on the record member representing the complete writing executed by the stylus member, and said dual actuating means being reversely operable in response to movement of the respective dual record member engaging means by the dual record tracks to actuate the stylus element to reproduce the writing, and means for clamping paper or the like beneath the stylus during the reproducing.

22. Recording and reproducing apparatus according to claim 21 wherein the means for clamping the paper will automatically release the paper after the writing has been reproduced.

23. Recording apparatus including a moving record element, a stylus element, means for recording scribing movement of the stylus element, means for driving the record element, control means for adjusting the speed of movement of the record element to a ratio with the speed of writing of the stylus element so that the recording of a complete writing may be spread out over a predetermined area of the record element, and means for indicating the speed of the moving record element.

24. Recording apparatus according to claim 23 wherein the indicating means is independent of the moving record element and visible to the operator at all times during recording.

25. Apparatus for reproducing writing and other line forms comprising a traveling record band having dual marginal record tracks representing a complete writing of a stylus element, a pair of members movable in fixed paths overlying transversely spaced areas of the record band pivoted about laterally spaced points, a pair of circular rollers having circumferential grooves for engaging the marginal record edges of the band movable in fixed paths, holder means on the respective movable members for supporting the circular rollers in operative engagement with the record band, a movable stylus element, and complementary dual actuating means operatively interconnecting the stylus element with the respective movable members.

26. Apparatus for reproducing writing or other line forms comprising a traveling record band having dual marginal record tracks representing a complete writing of the stylus element, a pair of members movable in fixed paths overlying transversely spaced areas of the record band pivoted about laterally spaced points, a pair of pick-up elements of large cross-section for following the marginal record band tracks movable in fixed paths, holder means on the respective movable members for supporting the pick-up elements in operative engagement with the record band, means for securing the pick-up elements to the holder means in axially offset relation thereto so that the operative surface of the pick-up elements and the axis of the holder means will occupy coincident positions, a movable stylus element and complementary dual actuating means operatively interconnecting the stylus element and the respective movable members.

LOUIS H. GLASSMAN.
CLARENCE W. BURGER.